United States Patent
Murakami et al.

(10) Patent No.: US 11,342,847 B2
(45) Date of Patent: May 24, 2022

(54) POWER CONVERSION DEVICE WITH CONTROLLER TO DISCHARGE SMOOTHING CAPACITORS

(71) Applicant: Mitsubishi Electric Corporation, Chiyoda-ku (JP)

(72) Inventors: Satoshi Murakami, Chiyoda-ku (JP); Hiroyasu Iwabuki, Chiyoda-ku (JP); Yoshihiro Takeshima, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/969,047

(22) PCT Filed: Feb. 25, 2019

(86) PCT No.: PCT/JP2019/006980
§ 371 (c)(1),
(2) Date: Aug. 11, 2020

(87) PCT Pub. No.: WO2019/171997
PCT Pub. Date: Sep. 12, 2019

(65) Prior Publication Data
US 2021/0036619 A1 Feb. 4, 2021

(30) Foreign Application Priority Data

Mar. 8, 2018 (JP) .............................. JP2018-041857

(51) Int. Cl.
*H02M 3/158* (2006.01)
(52) U.S. Cl.
CPC ........ *H02M 3/1584* (2013.01); *H02M 3/1586* (2021.05)
(58) Field of Classification Search
None
See application file for complete search history.

(56) References Cited

U.S. PATENT DOCUMENTS 5,166,869 A * 11/1992 Hesterman ............ H02M 3/337
  363/25
7,425,883 B2 * 9/2008 Matsutani ............... H01F 17/04
  336/83

(Continued)

FOREIGN PATENT DOCUMENTS

JP  2015-33153 A   2/2015
JP  2015-186272 A  10/2015

(Continued)

OTHER PUBLICATIONS

International Search Report dated Mar. 19, 2019 in PCT/JP2019/006980 filed on Feb. 25, 2019.

*Primary Examiner* — Jeffrey A Gblende
(74) *Attorney, Agent, or Firm* — Xsensus LLP

(57) ABSTRACT

A magnetically coupled reactor and a DC/DC converter are provided between a DC power supply and an inverter. A first smoothing capacitor is provided between the DC power supply and the coupled reactor. A second smoothing capacitor is provided between the DC/DC converter and the inverter. A controller is provided in order to control switching operations of the inverter and the DC/DC converter. The controller causes semiconductor switching elements composing upper and lower arms of the DC/DC converter to perform complementary operations so as to be alternately turned on/off, and causes left and right legs to operate with their switching phases shifted from each other, thereby electric charges stored in both smoothing capacitors are discharged by energy loss in the coupled reactor and the DC/DC converter.

15 Claims, 34 Drawing Sheets

(56) References Cited

U.S. PATENT DOCUMENTS

| | | | | |
|---|---|---|---|---|
| 8,912,764 | B2* | 12/2014 | Kanzaki | B60L 50/16 |
| | | | | 320/166 |
| 9,225,269 | B2* | 12/2015 | Hashimoto | B60L 50/62 |
| 9,997,990 | B2* | 6/2018 | Komatsu | H02P 6/00 |
| 10,014,776 | B2* | 7/2018 | Kobayashi | H02P 27/00 |
| 2017/0267103 | A1* | 9/2017 | Nomura | H02J 7/14 |

FOREIGN PATENT DOCUMENTS

| | | |
|---|---|---|
| JP | 2017-70007 A | 4/2017 |
| JP | 2017-85696 A | 5/2017 |

* cited by examiner

POWER CONVERSION DEVICE WITH CONTROLLER TO DISCHARGE SMOOTHING CAPACITORS

TECHNICAL FIELD

The present disclosure relates to a power conversion device mounted on an electric vehicle, for example.

BACKGROUND ART

Conventionally, there has been known an electric vehicle including a DC power supply capable of charging and discharging, a boost converter for boosting DC voltage supplied from the DC power supply, a first smoothing capacitor for smoothing voltage between the DC power supply and the boost converter, an inverter for converting high DC voltage outputted from the boost converter to AC voltage, a second smoothing capacitor for smoothing voltage between the boost converter and the inverter, and a three-phase AC electric motor to which the AC voltage outputted from the inverter is applied, whereby a driving force and a braking force of the vehicle are controlled.

In such an electric vehicle, in order to ensure safety of the vehicle, it is necessary to immediately discharge high-voltage electric charge stored in a smoothing capacitor when the vehicle collides or power is stopped, thereby preventing electric shock.

In addition, it is required that the capacity of a backup power supply serving as an operation power supply for performing discharge control of the boost converter so as to shorten the discharge period is reduced to downsize the power conversion device.

Therefore, conventionally, technologies as described in, for example, Patent Documents 1 and 2 below have been proposed.

An electric vehicle described in Patent Document 1 includes two bidirectional DC/DC converters, and capacitors are connected to a low-voltage end and a high-voltage end of the two bidirectional DC/DC converters. During traveling, a control device supplies drive pulse signals in which ON timings are shifted from each other and in which OFF timings are shifted from each other, to semiconductor switching elements of the bidirectional DC/DC converters. Meanwhile, at the time of discharging the capacitors, drive pulse signals having matched ON timings and matched OFF timings are supplied to the semiconductor switching elements of the bidirectional DC/DC converters in order to shorten the discharge period.

In a conventional method of discharging by alternately turning on and off upper and lower arms of an inverter, when the arms composing the inverter are short-circuited, discharging cannot be performed due to overcurrent or the like. In this regard, in a power conversion device described in Patent Document 2, a DC/DC converter having four arms connected in series is used, occurrence of arm short-circuit is detected, and electric charges stored in input and output capacitors are discharged via a coupled reactor and the DC/DC converter.

CITATION LIST

Patent Document

Patent Document 1: Japanese Laid-Open Patent Publication No. 2017-85696

Patent Document 2: Japanese Laid-Open Patent Publication No. 2015-33153

SUMMARY OF THE INVENTION

Problems to be Solved by the Invention

However, in both conventional technologies described in Patent Documents 1 and 2, currents flowing through the coupled reactor are triangular wave currents having a switching frequency, and the current components thereof contain only a switching frequency component of the DC/DC converter. Therefore, copper loss in current conduction is small, and thus an effect of consuming energy of the capacitors is small, so that it takes time to perform discharging. In addition, the power supply capacity of the backup power supply serving as an operation power supply for performing discharge control of the DC/DC converter so as to shorten the discharge period is still great.

The present disclosure has been made to solve the above problem, and an object of the present disclosure is to provide a power conversion device in which a pair of coupled reactors of a coupling type magnetically coupled are provided at an input stage of a DC/DC converter, and which enables the discharge period of capacitors to be shortened according to operation of the DC/DC converter in comparison with the conventional case, and which enables size reduction of a backup power supply for driving the DC/DC converter for discharge control.

Means of Solution to the Problems

A power conversion device according to the present disclosure includes: a coupled reactor magnetically coupled and a DC/DC converter for voltage conversion, which are provided between a DC power supply and an inverter for driving an electric motor; a first smoothing capacitor connected between the DC power supply and the coupled reactor; a second smoothing capacitor connected between the DC/DC converter and the inverter; a switch for turning on/off the DC power supply, the switch being interposed between the first smoothing capacitor and the DC power supply; and a controller configured to control switching operations of semiconductor switching elements included in the inverter and the DC/DC converter. The DC/DC converter has a full-bridge configuration in which two legs are connected in parallel, each leg being formed by connecting, in series, a pair of upper and lower arms having the semiconductor switching elements. The coupled reactor includes a first winding and a second winding each having one end side connected to a positive side of the DC power supply. The first winding has another end side connected to a connection point between the upper and lower arms composing a first leg of the legs. The second winding has another end side connected to a connection point between the upper and lower arms composing a second leg of the legs. The controller unit, in accordance with a discharge command, opens the switch, causes the semiconductor switching elements composing the upper and lower arms of the DC/DC converter to perform complementary operations so as to be alternately turned on/off, and causes the pair of legs to operate with their switching phases shifted from each other.

Effect of the Invention

According to a power conversion device of the present disclosure, circulating current can flow through a DC/DC converter and a coupled reactor between a first smoothing capacitor and a second smoothing capacitor, whereby electric charges stored in the first smoothing capacitor and the second smoothing capacitor can be immediately discharged by copper loss occurring in a path through which current flows, iron loss occurring in the core of the coupled reactor, and loss occurring in the DC/DC converter. Thus, the discharge period of the first smoothing capacitor and the second smoothing capacitor can be shortened in comparison with the conventional case, and accordingly, the backup power supply for driving the DC/DC converter for discharge control can be downsized.

In the case of using a differential-type coupled reactor in which DC magnetic fluxes are generated in such directions as to cancel out each other when DC current flows, a current component that is a multiple of the frequency is generated in the conduction current, whereby copper loss can be increased. In the case of using a cumulative-type coupled reactor in which DC magnetic fluxes are generated in such directions as to strengthen each other when DC current flows, the conduction current is made to be reflux current and thus have a square-wave shape, whereby the current effective value is increased and thus copper loss in the coupled reactor can be increased.

EMBODIMENTS FOR CARRYING OUT THE INVENTION

Embodiment 1

Figure 1:
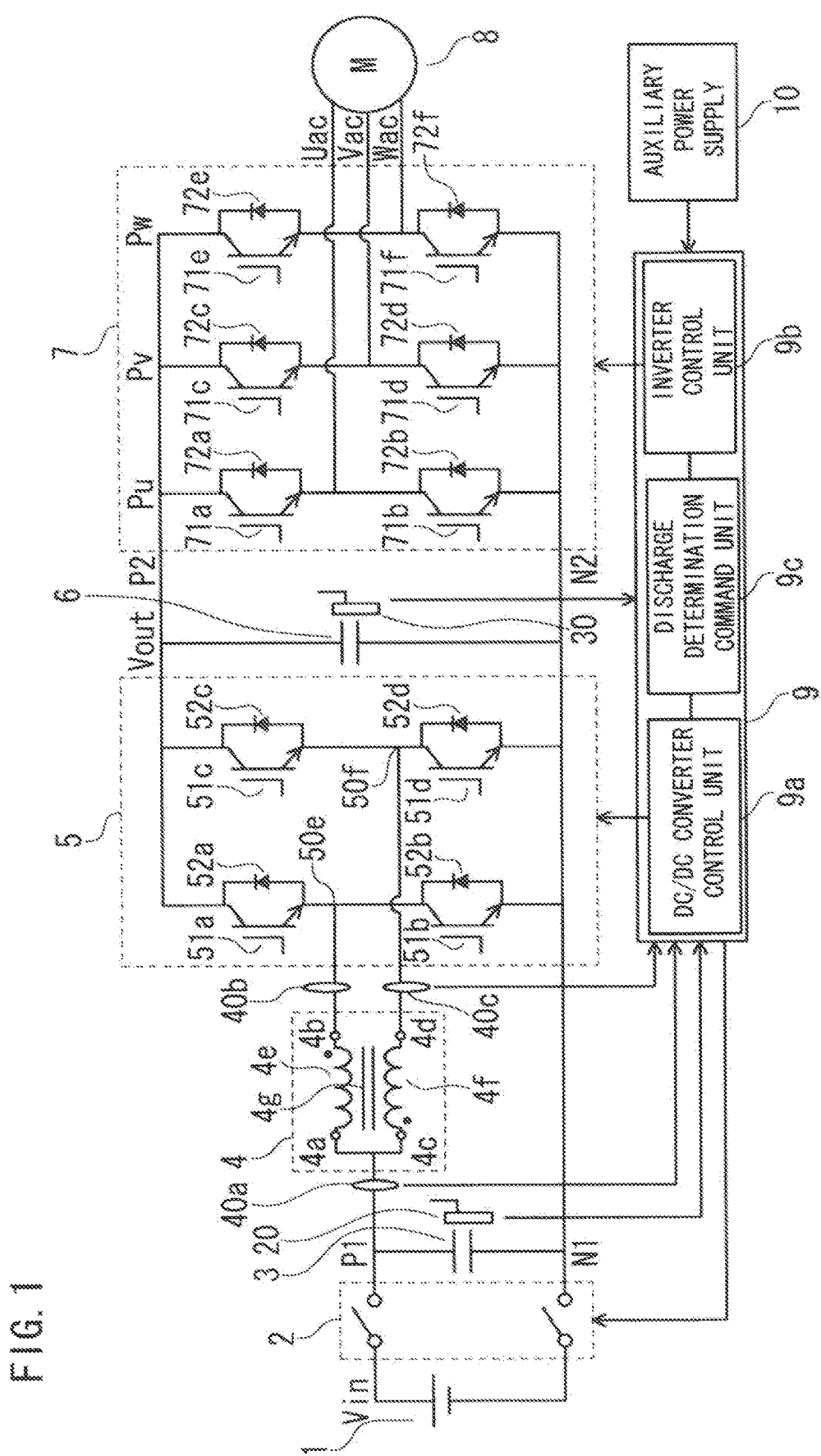
FIG. 1 is a configuration diagram showing the entirety of a power conversion device according to embodiment 1 of the present disclosure.

FIG. 1 is a configuration diagram showing a power conversion device according to embodiment 1 of the present disclosure.

In FIG. 1, the power conversion device according to the present embodiment includes a DC power supply 1, a switch 2 (the concept including a relay and a semiconductor switching element), a first smoothing capacitor 3, a first voltage sensor 20, a differential-type coupled reactor 4, a DC/DC converter 5, a second smoothing capacitor 6, a second voltage sensor 30, an inverter 7, an electric motor 8, a controller 9, and an auxiliary power supply 10.

The DC power supply 1 is capable of charging and discharging, and transmits/receives power to/from the electric motor 8 via the inverter 7. The DC/DC converter 5 is provided between the DC power supply 1 and the inverter 7, and boosts DC voltage supplied from the DC power supply 1. The first smoothing capacitor 3 is connected between the DC power supply 1 and the DC/DC converter 5, and smooths voltage between the DC power supply 1 and the DC/DC converter 5. The first voltage sensor 20 measures voltage between a high-voltage node and a low-voltage node of the first smoothing capacitor 3. A current sensor 40a measures current inputted to the differential-type coupled reactor 4. Current sensors 40b, 40c measure currents outputted between the differential-type coupled reactor 4 and the DC/DC converter 5.

The inverter 7 converts high DC voltage outputted from the DC/DC converter 5, to AC voltage, by DC/AC conversion. The second smoothing capacitor 6 is connected between the DC/DC converter 5 and the inverter 7, and smooths voltage between the DC/DC converter 5 and the inverter 7. The second voltage sensor 30 measures voltage between a high-voltage node and a low-voltage node of the second smoothing capacitor 6.

AC voltage outputted from the inverter 7 is applied to the electric motor 8, whereby a driving force and a braking force for the vehicle are controlled. During driving of the vehicle, the switch 2 is closed in order to connect the DC power supply 1, to the first smoothing capacitor 3 and the DC/DC converter 5. When usage of the vehicle is finished and stoppage of power is detected, or when collision of the vehicle is detected by an acceleration sensor (not shown) or the like, the switch 2 is opened in order to disconnect the DC power supply 1 from the DC/DC converter 5, the first smoothing capacitor 3 and the differential-type coupled reactor 4.

The controller 9 includes a DC/DC converter control unit 9a, an inverter control unit 9b, and a discharge determination command unit 9c. For example, when collision of the vehicle is detected by the acceleration sensor (not shown), or when usage of the vehicle is finished and power is stopped, the discharge determination command unit 9c commands the DC/DC converter control unit 9a and the inverter control unit 9b so as to discharge electric charges stored in the first smoothing capacitor 3 and the second smoothing capacitor 6.

The DC/DC converter control unit 9a controls switching operations of semiconductor switching elements 51a to 51d which are components of power semiconductor elements included in the DC/DC converter 5, and performs DC/DC conversion in the DC/DC converter 5. The inverter control unit 9b controls switching operations of semiconductor switching elements 71a to 71f in high-voltage-side power semiconductor elements and low-voltage-side power semiconductor elements of switching arms included in the inverter 7, and performs DC/AC conversion in the inverter 7.

Regarding the power semiconductor elements in the DC/DC converter 5, a unit in which each semiconductor switching element 51a to 51d and each semiconductor rectification element 52a to 52d are connected in antiparallel to each other is referred to as arm, and the arms connected in series to each other are referred to as leg. Similarly, regarding the power semiconductor element in the inverter 7, a unit in which each semiconductor switching element 71a to 71f and each semiconductor rectification element 72a to 72f are connected in antiparallel to each other is referred to as arm, and the arms connected in series to each other are referred to as leg.

Here, the configuration of the DC/DC converter 5 will be described in detail.

The DC/DC converter 5 is a full-bridge type in which four semiconductor switching elements 51a to 51d are provided, and is configured such that two legs (a first leg and a second leg) each formed by connecting the upper and lower arms in series are connected in parallel. In FIG. 1, insulated gate bipolar transistors (IGBT) are used and shown as the semiconductor switching elements. However, metal-oxide-semiconductor field-effect transistors (MOSFET) or the like may be used.

Next, the detailed configuration of the inverter 7 will be described.

In the inverter 7, legs the number of which corresponds to the number of phases of the electric motor to be driven are provided. As shown in FIG. 1, in the case where the electric motor 8 is a three-phase electric motor, the inverter 7 includes three legs for U phase, V phase, and W phase.

The inverter control unit 9b controls the inverter 7 to adjust the potentials of nodes Uac, Vac, Wac connected to the electric motor 8, thereby the amounts of currents flowing to the electric motor 8 can be controlled. As a result, the electric motor 8 controls the driving force and the braking force for the vehicle. In addition, the inverter control unit 9b acquires rotation information about the electric motor 8 as well.

Next, with reference to FIG. 2 to FIG. 4, the configuration of the coupled reactor 4 will be described.

Here, the coupled reactor is formed by a core 4g including two upper and lower U-shaped iron cores, and a first winding 4e and a second winding 4f wound around the core 4g so as to be magnetically coupled. In particular, the differential-type coupled reactor 4 in the present embodiment refers to a coupled reactor in which the first winding 4e and the second winding 4f are wound so that DC magnetic fluxes generated in the core 4g by both windings 4e, 4f are formed in such directions as to cancel out each other when DC current flows through the first winding 4e and the second winding 4f, as shown in FIG. 2.

One end side 4a and one end side 4c of both windings 4e, 4f composing the differential-type coupled reactor 4 are connected to the positive side of the DC power supply 1. Another end side 4b of the first winding 4e is connected to a connection point 50e (first leg) between the upper arm and the lower arm having two semiconductor switching elements 51a, 51b. Another end side 4d of the second winding 4f is connected to a connection point 50f (second leg) between the upper arm and the lower arm having two semiconductor switching elements 51c, 51d.

The upper and lower arms of the DC/DC converter 5, which are connected to the differential-type coupled reactor 4, are complementarily operated so as to be alternately turned on/off, and also, the legs are operated such that their phases are shifted from each other to alternately excite the first winding 4e and the second winding 4f. Thus, the following two magnetic flux components are generated at the same time: as shown by outline arrows in FIG. 2, a magnetic flux component that is generated by currents flowing through the first winding 4e and the second winding 4f in the same direction and that does not circulate through the core 4g, and as shown by thick arrows in FIG. 3 and FIG. 4, a magnetic flux component that circulates in the core 4g while the direction thereof is changed depending on the switching state. In this case, since the magnetic fluxes and the currents have a proportional relationship each other, current ripples that correspond to changes in the two magnetic flux components occur in the first winding 4e and the second winding 4f.

Here, the slopes of current ripples occurring in the differential-type coupled reactor 4 will be shown using mathematical expressions. The voltage across the first winding 4e is denoted by V1e and current flowing through the first winding 4e is denoted by i1, and in the current i1, a current component due to a circulating magnetic flux is denoted by i1ac, and a current component due to a non-circulating magnetic flux is denoted by i1dc. In addition, voltage across the second winding 4f is denoted by V2e and current flowing through the second winding 4f is denoted by i2, and in the current i2, a current component due to a circulating magnetic flux is denoted by i2ac, and a current component due to a non-circulating magnetic flux is denoted by i2dc. Here, for the purpose of simplification, the magnitudes of the components of the current i1 and the current i2 are assumed to be equal.

When the self-inductances of the first winding 4e and the second winding 4f are denoted by L and the mutual inductance therebetween is denoted by M, the voltages V1e, V2e occurring in the first winding 4e and the second winding 4f are represented by (Expression 1) and (Expression 2), using Faraday's law.

[Numeral 1]

$$V1e = L \cdot \frac{d}{dt} i1 - M \cdot \frac{d}{dt} i2 \quad \text{(Expression 1)}$$

[Numeral 2]

$$V2e = L \cdot \frac{d}{dt} i2 - M \cdot \frac{d}{dt} i1 \quad \text{(Expression 2)}$$

The current i1 and the current i2 are composed of the current component i1ac due to the circulating magnetic flux and the current component i1dc due to the non-circulating magnetic flux, and therefore (Expression 3) and (Expression 4) are established.

[Numeral 3]

$$\frac{di1}{dt} = \frac{di1dc}{dt} + \frac{di1ac}{dt} \quad \text{(Expression 3)}$$

[Numeral 4]

$$\frac{di2}{dt} = \frac{di1dc}{dt} - \frac{di1ac}{dt} \quad \text{(Expression 4)}$$

When the current i1 and the current i2 are summed, as shown by the following (Expression 5), the circulation current components (i1ac) are canceled out. Thus a slope that is a multiple of the current component (i1dc) caused due to the non-circulating magnetic flux component in each winding is obtained.

[Numeral 5]

$$\frac{di1}{dt} + \frac{di2}{dt} = 2\frac{di1dc}{dt} \quad \text{(Expression 5)}$$

From (Expression 1) to (Expression 4), the current components i1ac, i1dc contained in the current i1 and the current i2 can be calculated as shown by (Expression 6) and (Expression 7).

[Numeral 6]

$$\frac{di1ac}{dt} = \frac{1}{(L+M)} \frac{(V1e - V2e)}{2} \quad \text{(Expression 6)}$$

[Numeral 7]

$$\frac{di1dc}{dt} = \frac{1}{(L-M)} \frac{(V1e + V2e)}{2} \quad \text{(Expression 7)}$$

The input voltage to the differential-type coupled reactor 4 is denoted by Vin, and the output voltage of the DC/DC converter 5 is denoted by Vout. Table 1 shows the voltage across the coupled reactor 4, which changes depending on the switching states of the semiconductor switching elements 51b, 51d of the lower arms of the DC/DC converter 5.

TABLE 1

Voltage across reactor depending on switching states

| 51b | 51d | V1e | V2e | V1e + V2e | V1e − V2e |
|---|---|---|---|---|---|
| ON | OFF | Vin | Vin − Vout | 2Vin − Vout | Vout |
| OFF | ON | Vin − Vout | Vin | 2Vin − Vout | −Vout |
| ON | ON | Vin | Vin | 2Vin | 0 |
| OFF | OFF | Vin − Vout | Vin − Vout | 2Vin − 2Vout | 0 |

By substituting the above voltage into (Expression 6) and (Expression 7), it is possible to calculate the slope of current that changes according to the switching states.

Next, in the case of normal driving of the vehicle, i.e., normal power conversion operation in which, while the switch 2 is turned on, the two legs of the DC/DC converter 5 are alternately operated with their phases shifted from each other to alternately excite the first winding 4e and the second winding 4f, current ripples occurring in the first winding 4e and the second winding 4f will be described on the basis of the slopes of currents calculated in the above (Expression 3) to (Expression 7), with reference to FIG. 5 and FIG. 6.

Figure 5:
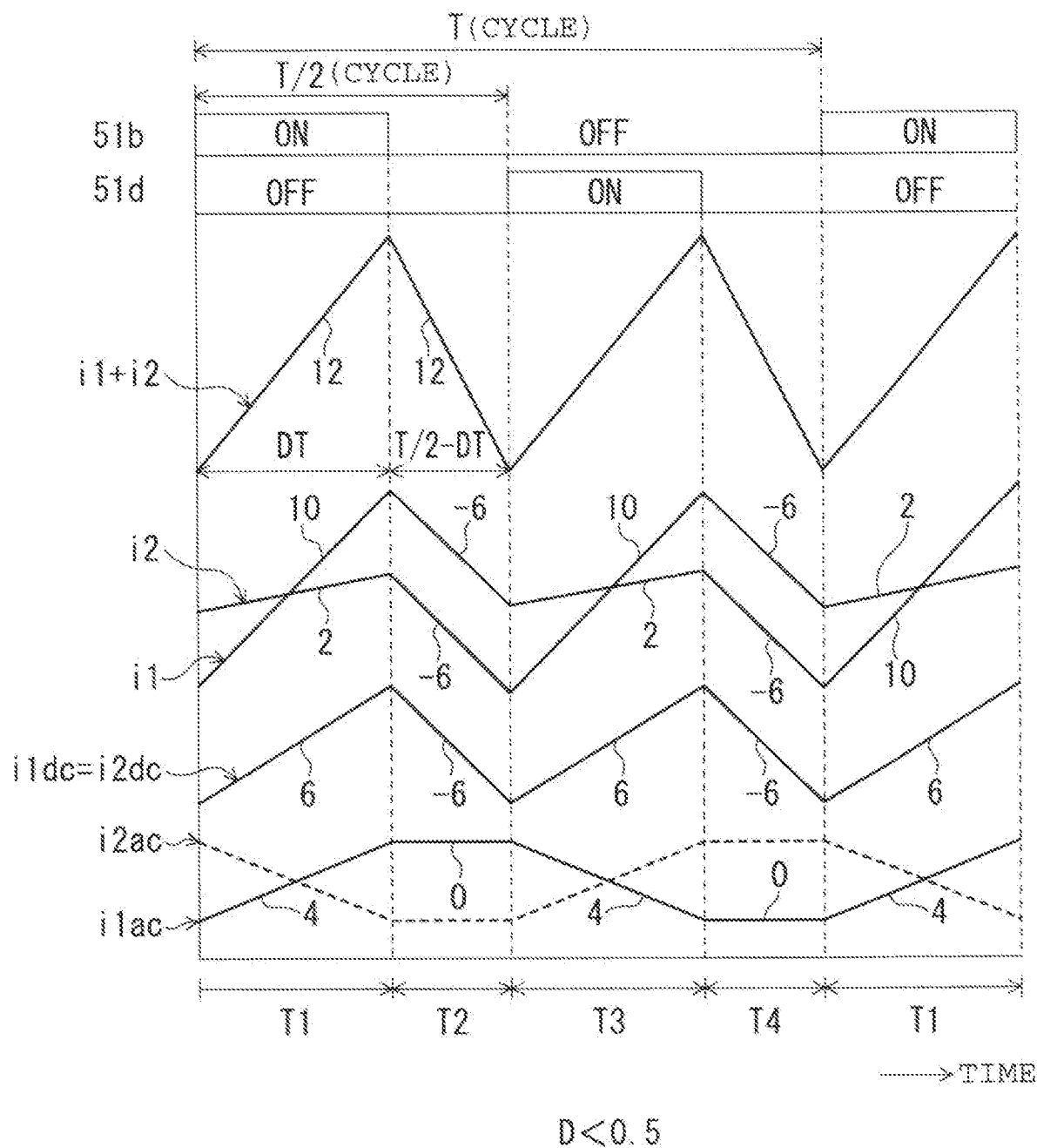
FIG. 5 illustrates changes over time in the slopes of currents flowing through the coupled reactor in the case of D<0.5, in embodiment 1 of the present disclosure.
Figure 6:
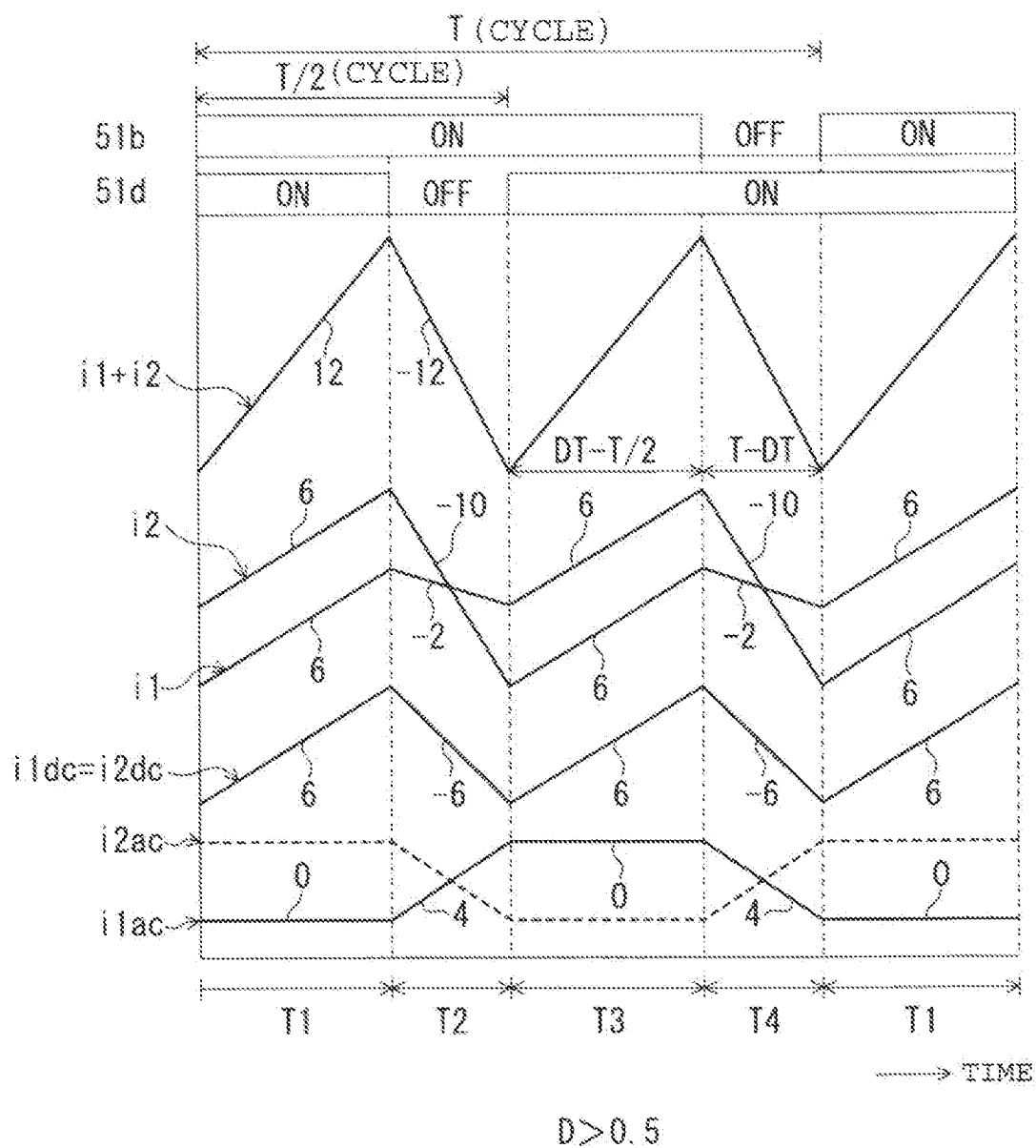
FIG. 6 illustrates changes over time in the slopes of currents flowing through the coupled reactor in the case of D>0.5, in embodiment 1 of the present disclosure.

FIG. 5 shows the case of D (duty ratio) <0.5, and FIG. 6 shows the case of D (duty ratio) >0.5.

In FIG. 5 and FIG. 6, it is assumed that the current components contained in the current ripples in the first winding 4e and the second winding 4f satisfy idc<iac. The duty ratio D is the ratio of the ON period to the cycle T.

Regarding operation modes, four modes of state (T1), state (T2), state (T3), and state (T4) are sequentially repeated in accordance with the operation states of the semiconductor switching elements 51b, 51d which are the lower arms of the DC/DC converter 5. It is noted that the semiconductor switching elements 51a, 51c, in the case of MOSFET or the like, operate for synchronous rectification complementarily with the semiconductor switching elements 51b, 51d.

[A] First, as shown in FIG. 5, current ripples occurring in the first winding 4e and the second winding 4f in the case of D<0.5 will be described.

(1) During the period in state (T1), the semiconductor switching element 51b is ON and the semiconductor switching element 51d is OFF, and the following two current loops are formed: a current loop of current i1 flowing from the DC power supply 1 through the first winding 4e and returning to the DC power supply 1, and a current loop of current i2 flowing through the second winding 4f, the semiconductor rectification element 52c and the second smoothing capacitor 6, and returning to the DC power supply 1.

At this time, the first winding 4e and the second winding 4f form the differential-type coupled reactor 4 which is magnetically coupled. Therefore, in the first winding 4e, current ripple i1ac due to a circulating magnetic flux as shown in FIG. 4 and current ripple i1dc due to a non-circulating magnetic flux component as shown in FIG. 2, are generated.

Figure 2:
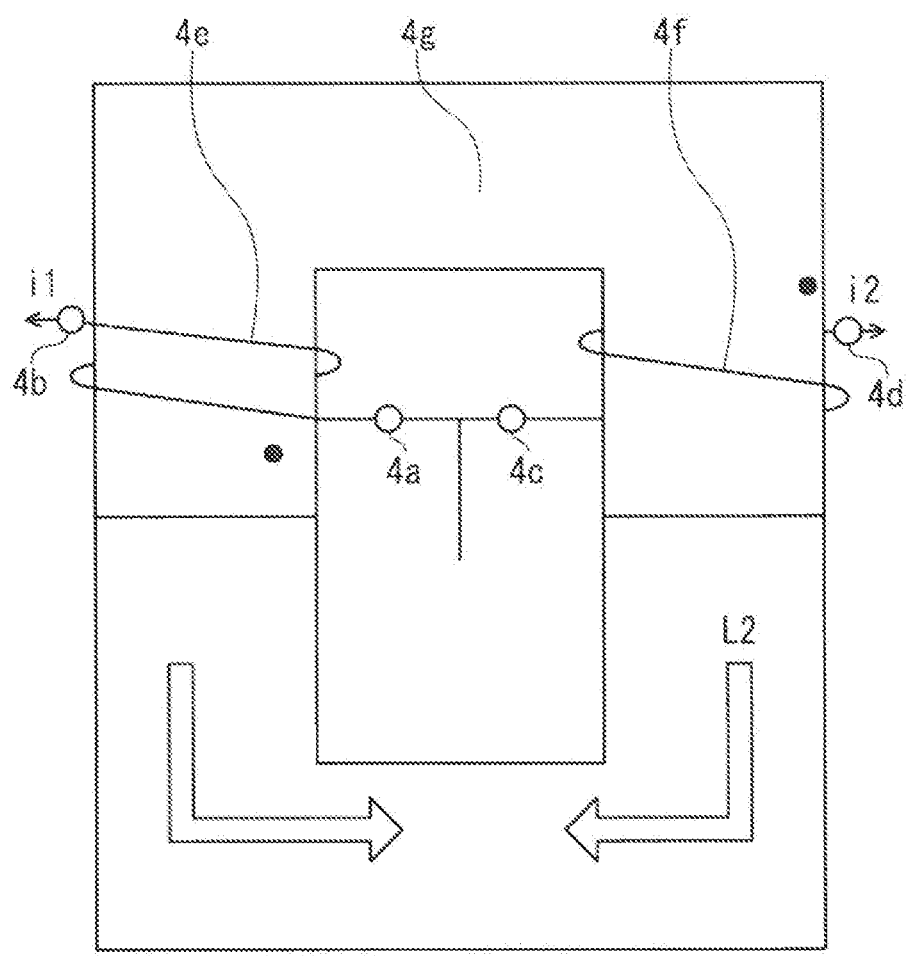
FIG. 2 illustrates the magnetic flux generating state of a differential-type coupled reactor in embodiment 1 of the present disclosure.
Figure 3:
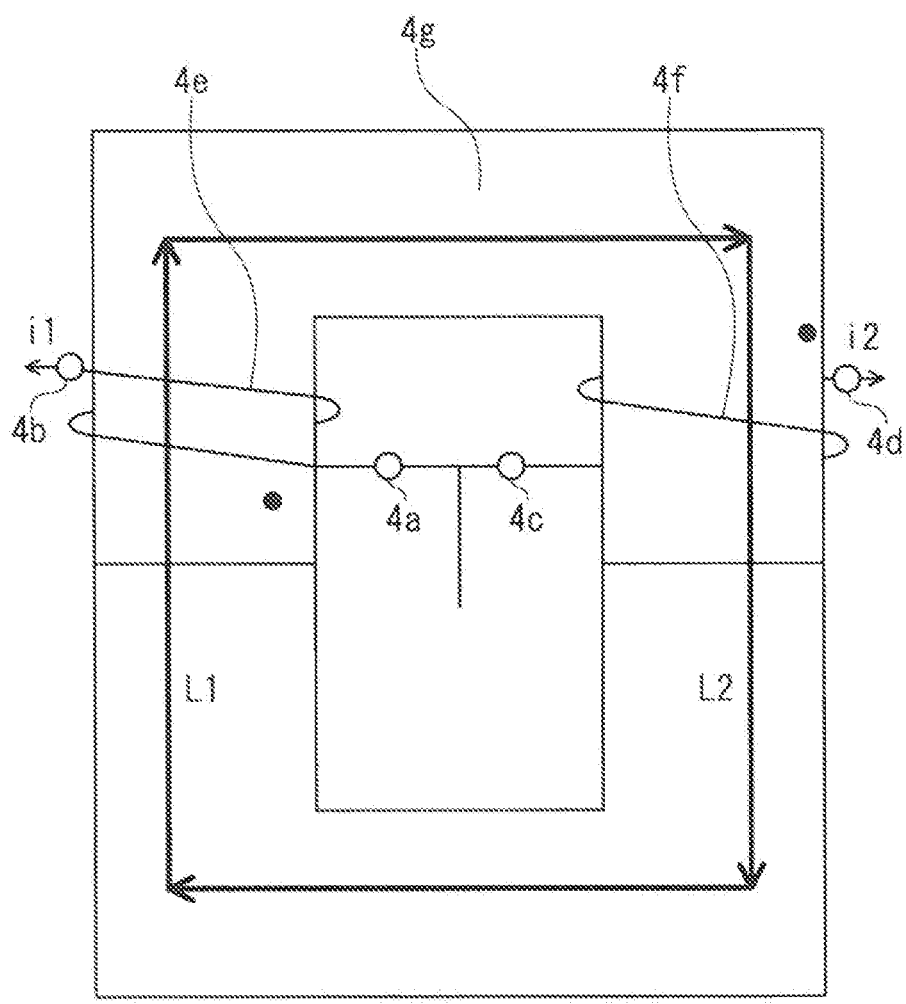
FIG. 3 illustrates the magnetic flux generating state of the differential-type coupled reactor in embodiment 1 of the present disclosure.

In the second winding 4f, current ripple i2ac (in this case, generated in the direction opposite to i1ac) due to a circulating magnetic flux as shown in FIG. 3 and current ripple i2dc due to a non-circulating magnetic flux component as shown in FIG. 2, are generated.

Here, for simplification of the description, it is assumed that the slope of the current component occurring due to a circulating magnetic flux is 4, and the slope of the current component occurring due to a non-circulating magnetic flux is 6. Using this numerical value example, changes in the waveforms of current ripples occurring in the first winding 4e and the second winding 4f which change according to the switching state of the DC/DC converter 5 will be described.

During this period, the slope of the current i1ac is 4, the slope of the current i1dc is 6, and thus the slope of current of the first winding 4e is 10. In addition, regarding the slope of the sum of currents of the first winding 4e and the second winding 4f, i1ac and i2ac are canceled out each other, so that the slope is the sum of the slopes of i1dc and i2dc, i.e., 12.

(2) During the period in state (T2), the semiconductor switching element 51b is OFF and the semiconductor switching element 51d is OFF, and the following current loops are formed: a current loop of current i1 flowing from the DC power supply 1 through the first winding 4e, the semiconductor rectification element 52a and the second smoothing capacitor 6, and returning to the DC power supply 1; and a current loop of current i2 flowing from the DC power supply 1 through the second winding 4f, the semiconductor rectification element 52c and the second smoothing capacitor 6, and returning to the DC power supply 1.

This period is a period in which excitation of the first winding 4e and the second winding 4f is reset. And i1ac and i2ac do not change and the components i1dc and i2dc decrease. The slope of the current i1ac is 0, the slope of current i1dc is −6, and thus the slope of current of the first winding 4e is −6. The slope of the sum of currents of the first winding 4e and the second winding 4f is the sum of the slopes of i1dc and i2dc, i.e., −12.

(3) During the period in state (T3), the semiconductor switching element 51b is OFF and the semiconductor switching element 51d is ON, and the following current loops are formed: a current loop of current i1 flowing from the DC power supply 1 through the first winding 4e, the semiconductor rectification element 52a and the second smoothing capacitor 6, and returning to the DC power supply 1; and a current loop of current i2 flowing from the DC power supply 1 through the second winding 4f and the semiconductor switching element 51d, and returning to the DC power supply 1.

At this time, the first winding 4e and the second winding 4f form the differential-type coupled reactor 4 which is magnetically coupled. Therefore, in the first winding 4e, current ripple i1ac due to a circulating magnetic flux as shown in FIG. 3 and current ripple i1dc due to a non-circulating magnetic flux component as shown in FIG. 2, are generated.

Figure 4:
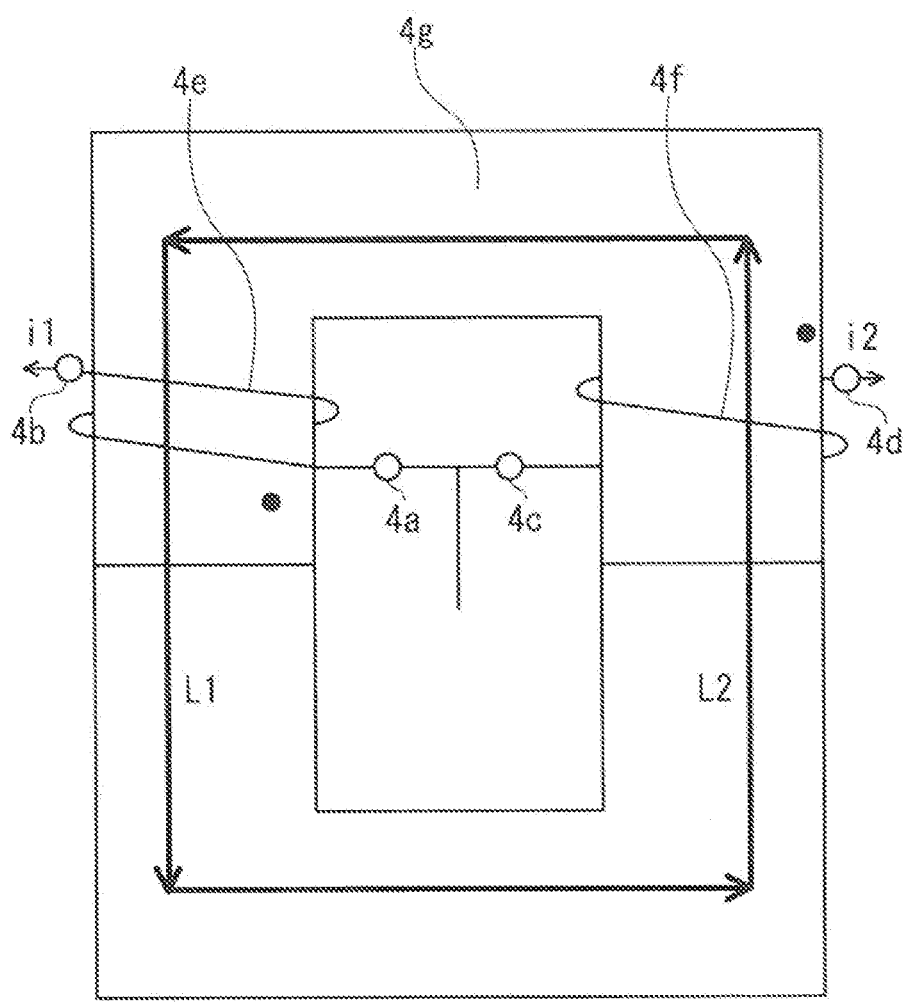
FIG. 4 illustrates the magnetic flux generating state of the differential-type coupled reactor in embodiment 1 of the present disclosure.

In the second winding 4f, current ripple i2ac (in this case, generated in the direction opposite to i1ac) due to a circulating magnetic flux as shown in FIG. 4 and current ripple i2dc due to a non-circulating magnetic flux component as shown in FIG. 2, are generated.

At this time, magnetic coupling is made such that the magnetic flux from the second winding 4f is generated in a direction so as to decrease the magnetic flux of the first winding 4e, and thus i1ac has a minus slope. Similarly, the slope of current i1ac is −4, the slope of current i1dc is 6, and thus the slope of current of the first winding 4e is 2. Regarding the slope of the sum of currents of the first winding 4e and the second winding 4f, i1ac and i2ac are canceled out each other, so that the slope is the sum of the slopes of i1dc and i2dc, i.e., 12.

(4) During the period in state (T4), as well as in the case of state (T2), the semiconductor switching element 51b is OFF and the semiconductor switching element 51d is OFF. And the following current loops are formed: a current loop of current i1 flowing from the DC power supply 1 through the first winding 4e, the semiconductor rectification element 52a and the second smoothing capacitor 6, and returning to the DC power supply 1; and a current loop of current i2 flowing from the DC power supply 1 through the second winding 4f, the semiconductor rectification element 52c and the second smoothing capacitor 6, and returning to the DC power supply 1.

This period is a period in which excitation of the first winding 4e and the second winding 4f is reset, and i1ac and i2ac do not change and the components i1dc and i2dc decrease. The slope of current i1ac is 0, the slope of current i1dc is −6, and thus the slope of current of the first winding 4e is −6. The slope of the sum of currents of the first winding 4e and the second winding 4f is the sum of the slopes of i1dc and i2dc, i.e., −12.

As described above, in the case of D<0.5, regarding the first winding 4e, the slope of current i1 is plus during the state (T3), and the current components include a current component that is a multiple of the switching frequency of switching of the DC/DC converter 5.

[B] Next, as shown in FIG. 6, current ripples occurring in the first winding 4e and the second winding 4f in the case of D>0.5 will be described.

(1) During the period in state (T1), the semiconductor switching element 51b is ON and the semiconductor switching element 51*d* is ON, and the following current loops are formed: a current loop of current i1 flowing from the DC power supply 1 through the first winding 4*e* and returning to the DC power supply 1, and a current loop of current i2 flowing through the second winding 4*f* and returning to the DC power supply 1.

During this period, in the first winding 4*e* and the second winding 4*f*, currents i1*ac*, i2*ac* due to a circulating magnetic flux component are zero and current ripples i1*dc*, i2*dc* occurring due to a non-circulating magnetic flux component increase.

Therefore, during this period, as well as in the above case of D<0.5, it is assumed that the slope of current i1*ac* is 0 and the slope of current i1*dc* is 6 for simplification of the description, and the slope of current of the first winding 4*e* is 6. Since the components i1*ac* and i2*ac* are zero, the slope of the sum of currents of the first winding 4*e* and the second winding 4*f* is the sum of the slopes of i1*dc* and i2*dc*, i.e., 12.

(2) During the period in state (T2), the semiconductor switching element 51*b* is ON and the semiconductor switching element 51*d* is OFF, and the following current loops are formed: a current loop of current i1 flowing from the DC power supply 1 through the first winding 4*e* and returning to the DC power supply 1, and a current loop of current i2 flowing through the second winding 4*f*, the semiconductor rectification element 52*c* and the second smoothing capacitor 6, and returning to the DC power supply 1.

During this period, a circulating magnetic flux occurs in the first winding 4*e* and the second winding 4*f*, so that i1*ac* increases and i2*ac* decreases. On the other hand, i1*dc* and i2*dc* occurring due to a non-circulating component decrease. Therefore, it is assumed that the slope of current i1*ac* is 4 and the slope of current i1*dc* is −6, the slope of current of the first winding 4*e* is −2. Regarding the slope of the sum of currents of the first winding 4*e* and the second winding 4*f*, the components i1*ac* and i2*ac* are canceled out each other, so that the slope is the sum of the slopes of i1*dc* and i2*dc*, i.e., −12.

(3) During the period in state (T3), the semiconductor switching element 51*b* is ON and the semiconductor switching element 51*d* is ON, and thus this period is the same as in the case of state (T1).

(4) During the period in state (T4), the semiconductor switching element 51*b* is OFF and the semiconductor switching element 51*d* is ON, and the following current loops are formed: a current loop of current i1 flowing from the DC power supply 1 through the first winding 4*e*, the semiconductor rectification element 52*a* and the second smoothing capacitor 6, and returning to the DC power supply 1; and a current loop of current i2 flowing through the second winding 4*f* and returning to the DC power supply 1.

During this period, a circulating magnetic flux occurs in the first winding 4*e* and the second winding 4*f*, so that i1*ac* decreases and i2*ac* increases. On the other hand, i1*dc* and i2*dc* occurring due to a non-circulating component decrease. Therefore, the slope of current i1*ac* is −4, the slope of current i1*dc* is −6, and thus the slope of current of the first winding 4*e* is −10. Regarding the slope of the sum of currents of the first winding 4*e* and the second winding 4*f*, the components i1*ac* and i2*ac* are canceled out each other, so that the slope is the sum of the slopes of i1*dc* and i2*dc*, i.e., −12.

As described above, in the case of D>0.5, regarding the first winding 4*e*, the slope of current i1 is minus during the state (T2), and therefore the current components include a current component that is a multiple of the switching frequency of switching of the DC/DC converter 5.

In order that the current components may include a large amount of current component that is a multiple of the switching frequency of switching of the DC/DC converter 5, it is necessary that, in the case of D<0.5, the following (Expression 8) is satisfied during the period in state (T3), and in the case of D>0.5, the following (Expression 9) is satisfied during the period in state (T2).

[Numeral 8]

$$\frac{di1dc}{dt} + \frac{di1ac}{dt} > 0 \qquad \text{(Expression 8)}$$

[Numeral 9]

$$\frac{di1dc}{dt} + \frac{di1ac}{dt} < 0 \qquad \text{(Expression 9)}$$

Using (Expression 6), (Expression 7), and Table 1, the relational expressions of (Expression 8) and (Expression 9) are arranged by using L (self-inductance), M (mutual inductance), and D (duty ratio). As a result, the following (Expression 10) and (Expression 11) are obtained.

Case of D<0.5

[Numeral 10]

$$\frac{M}{L} > \frac{D}{1-D} \qquad \text{(Expression 10)}$$

Case of D>0.5

[Numeral 11]

$$\frac{M}{L} > \frac{1-D}{D} \qquad \text{(Expression 11)}$$

Figure 7:
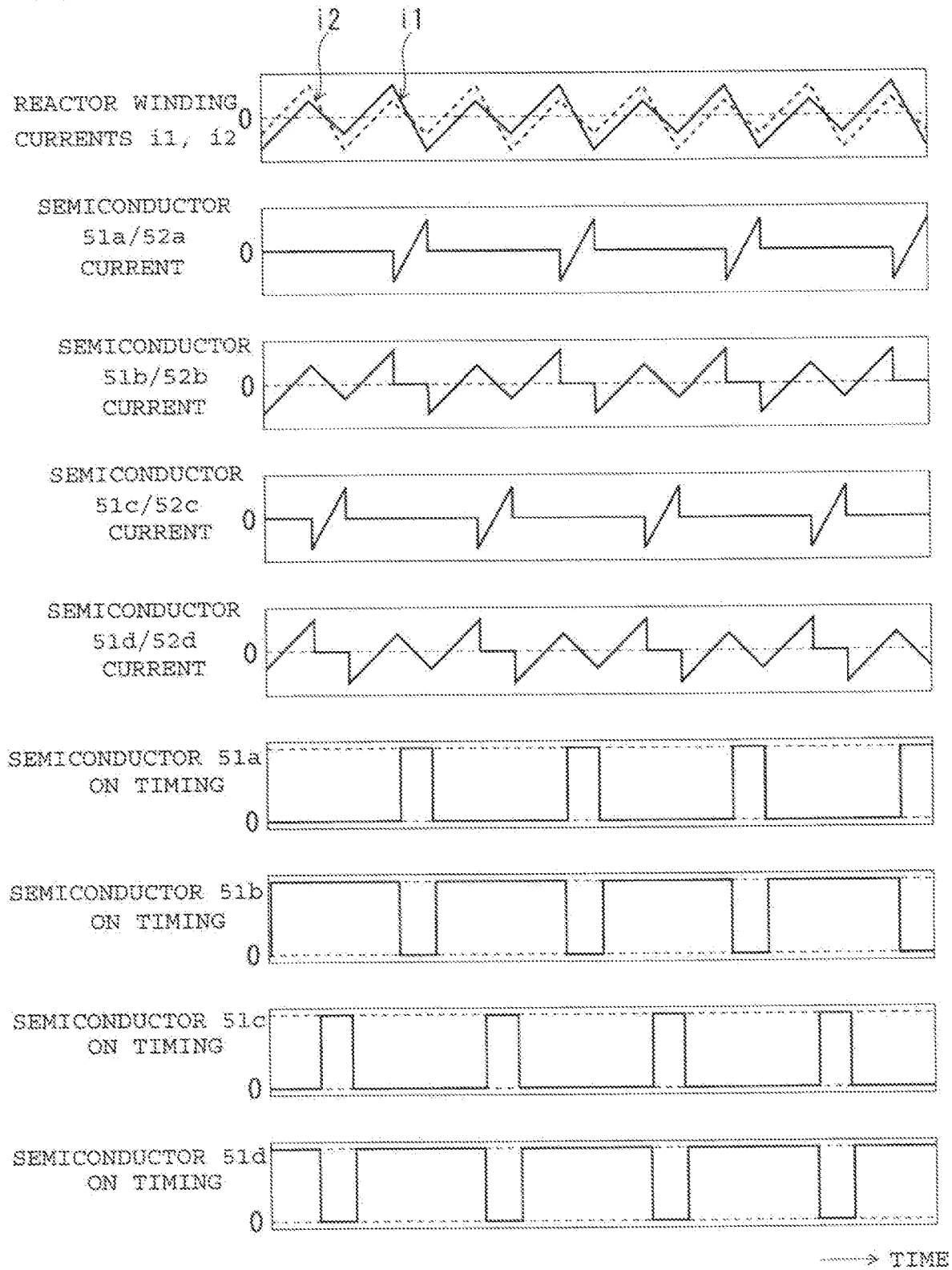
FIG. 7 illustrates the operation timings of a DC/DC converter and changes over time in currents flowing through windings of the coupled reactor and each part of the DC/DC converter, in embodiment 1 of the present disclosure.
Figure 8:
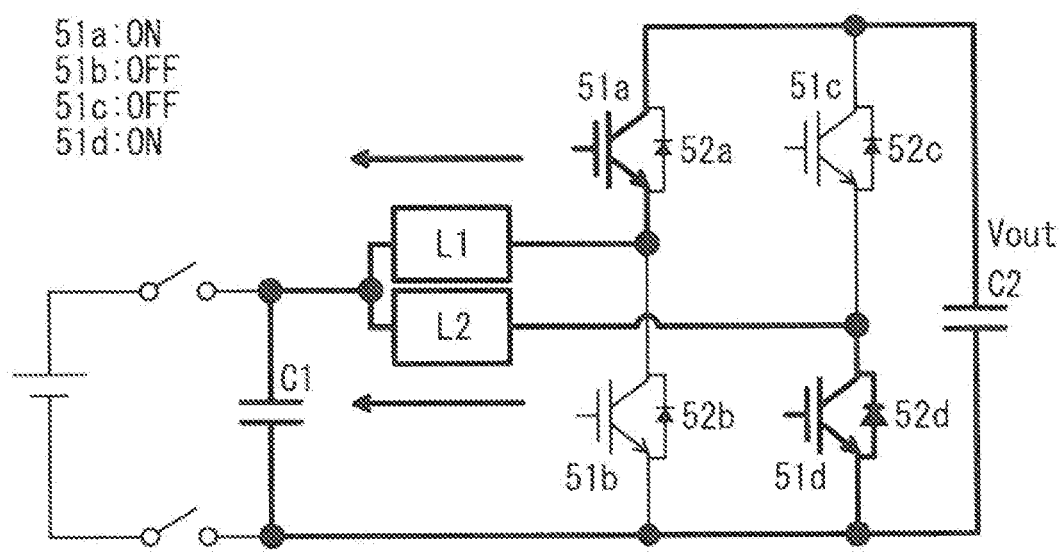
FIG. 8 illustrates an operation pattern of the DC/DC converter according to embodiment 1 of the present disclosure.
Figure 9:
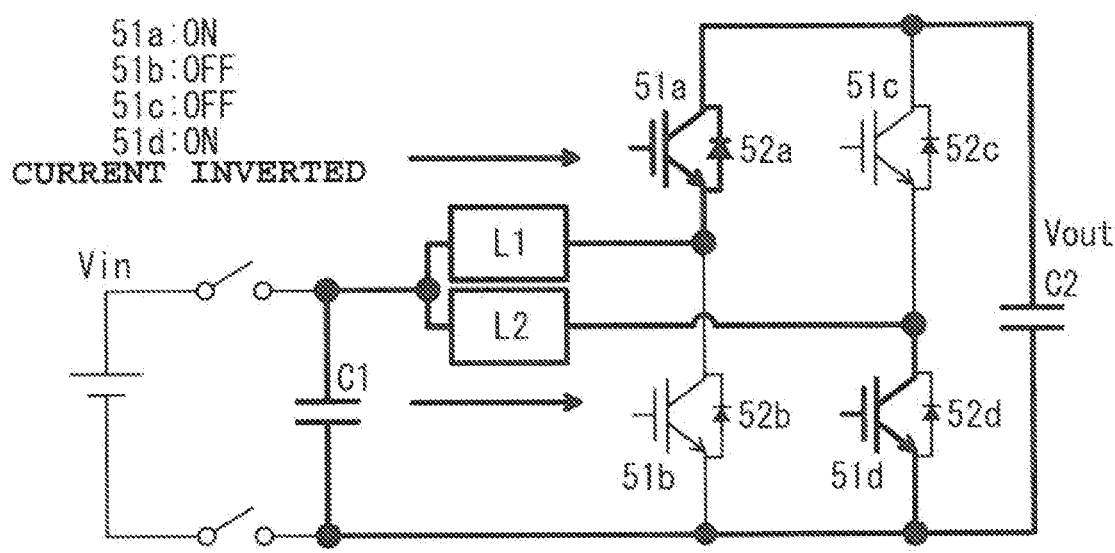
FIG. 9 illustrates an operation pattern of the DC/DC converter according to embodiment 1 of the present disclosure.
Figure 10:
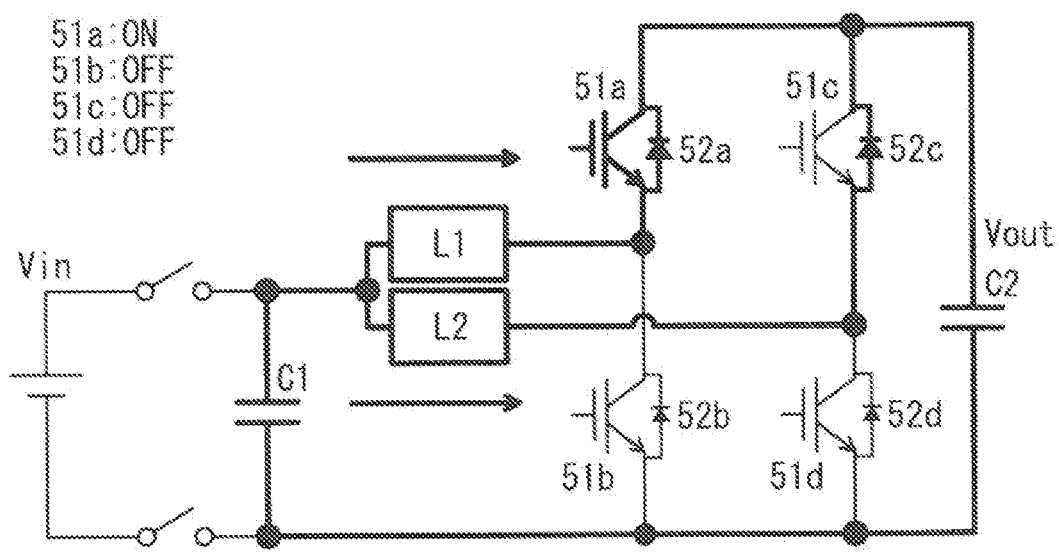
FIG. 10 illustrates an operation pattern of the DC/DC converter according to embodiment 1 of the present disclosure.
Figure 11:
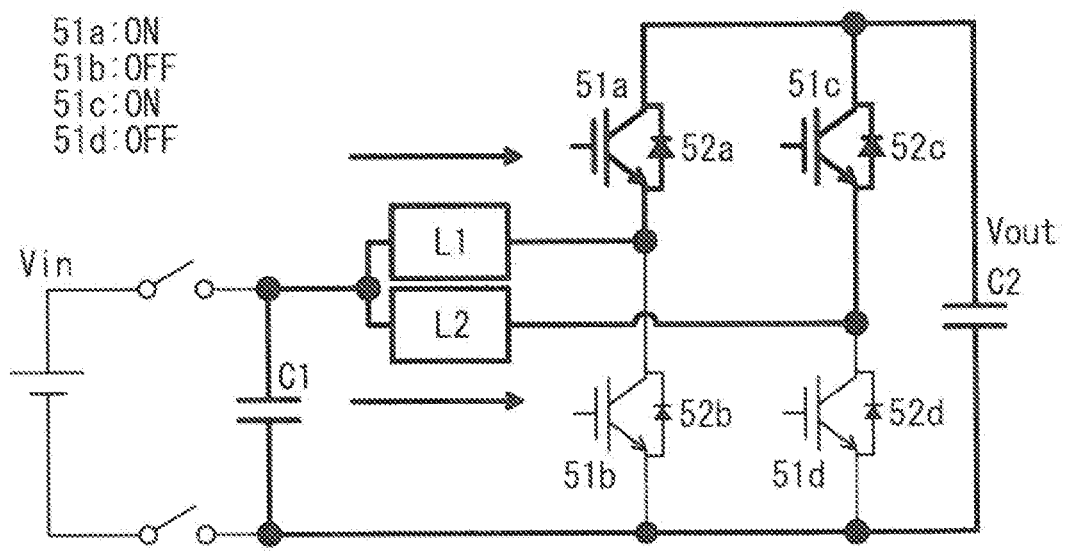
FIG. 11 illustrates an operation pattern of the DC/DC converter according to embodiment 1 of the present disclosure.
Figure 12:
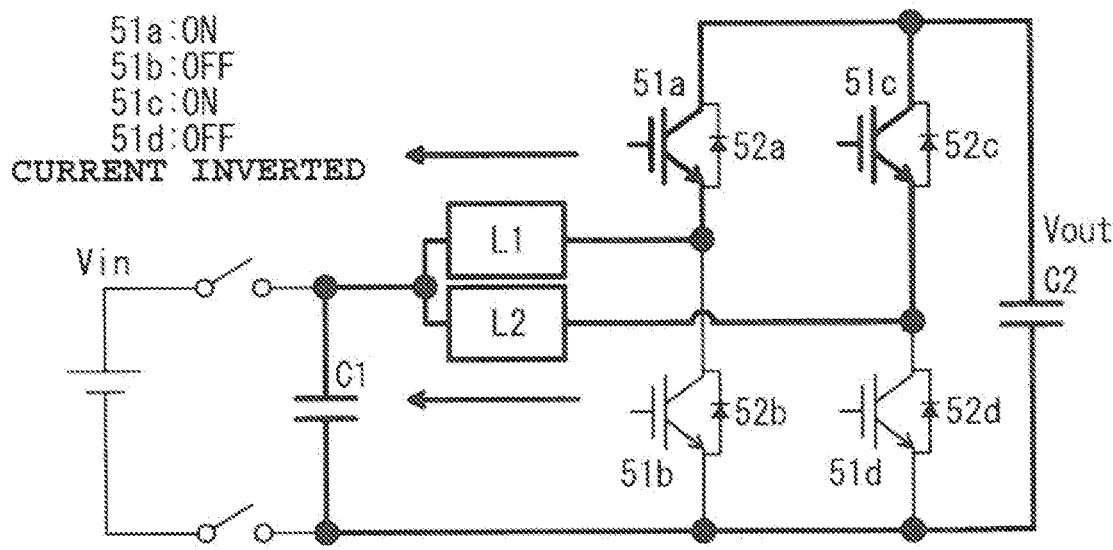
FIG. 12 illustrates an operation pattern of the DC/DC converter according to embodiment 1 of the present disclosure.
Figure 13:
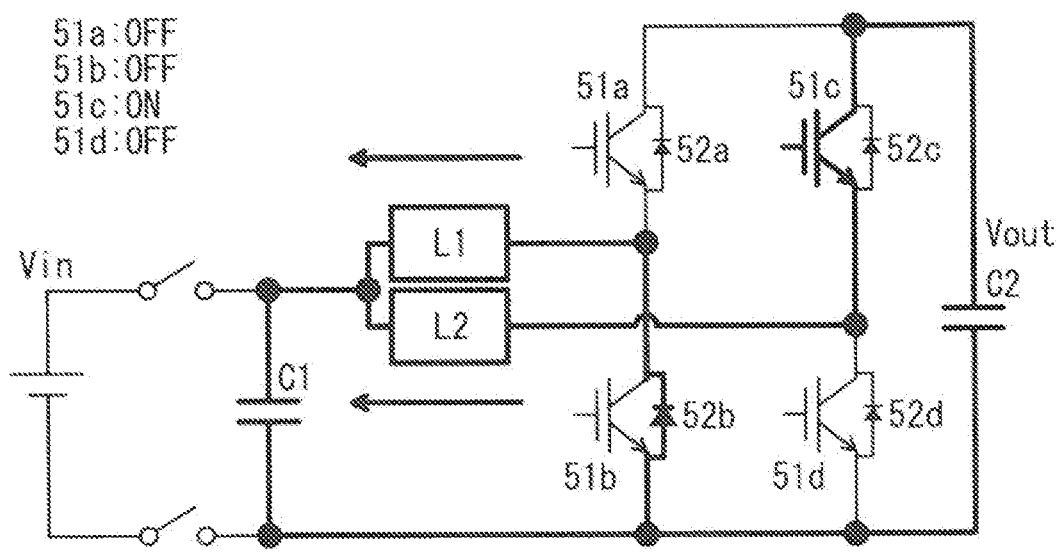
FIG. 13 illustrates an operation pattern of the DC/DC converter according to embodiment 1 of the present disclosure.
Figure 14:
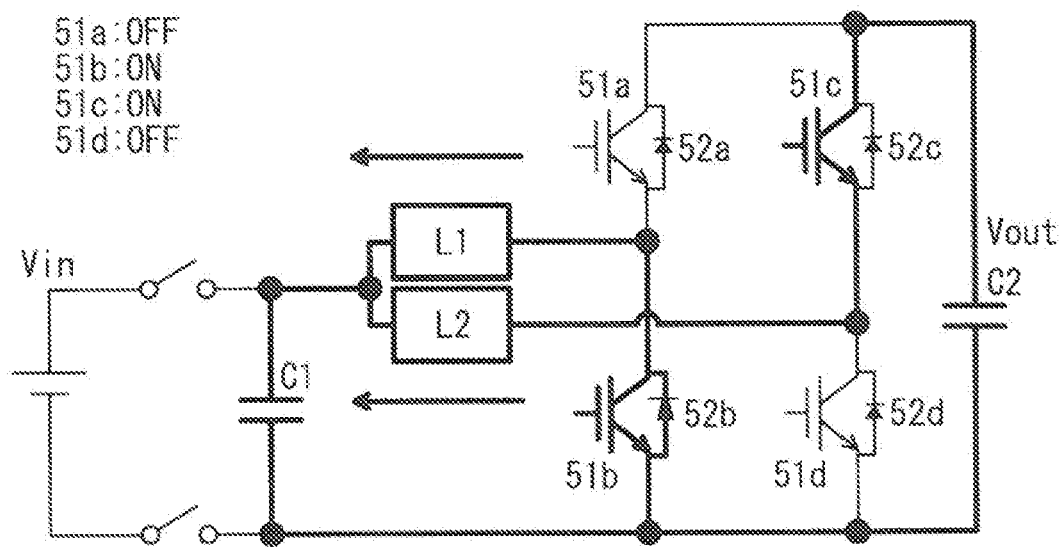
FIG. 14 illustrates an operation pattern of the DC/DC converter according to embodiment 1 of the present disclosure.
Figure 15:
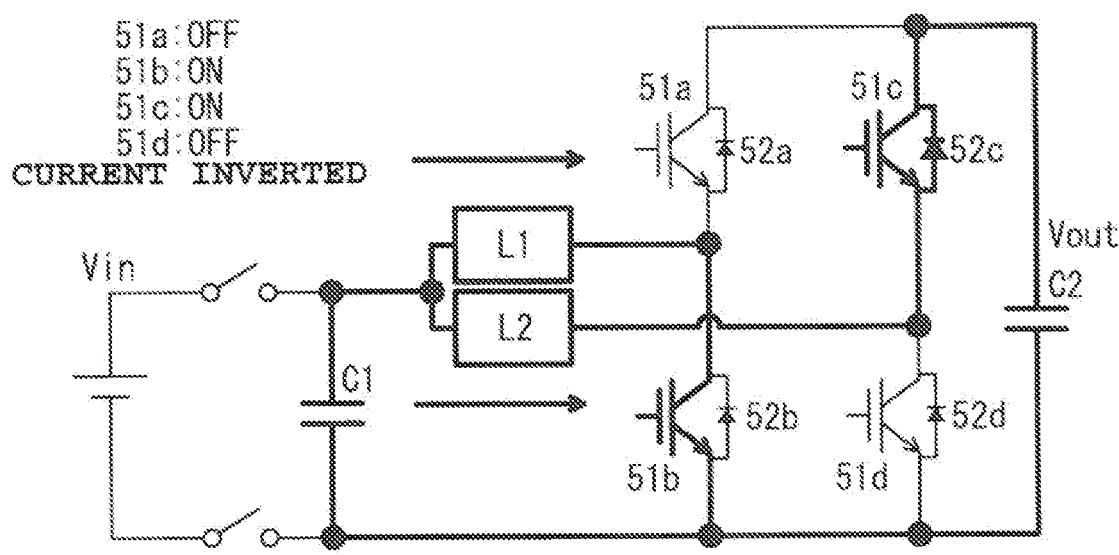
FIG. 15 illustrates an operation pattern of the DC/DC converter according to embodiment 1 of the present disclosure.
Figure 16:
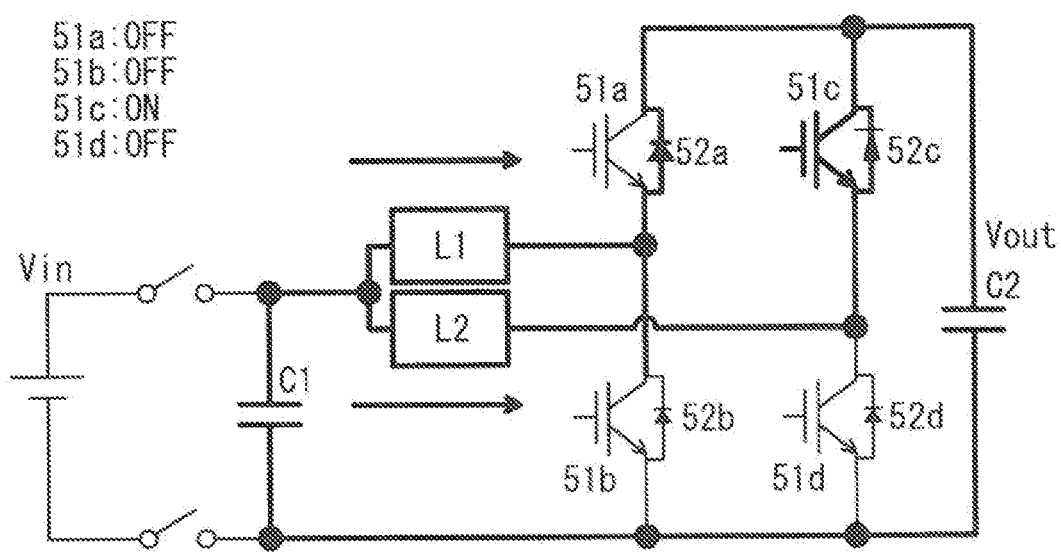
FIG. 16 illustrates an operation pattern of the DC/DC converter according to embodiment 1 of the present disclosure.
Figure 17:
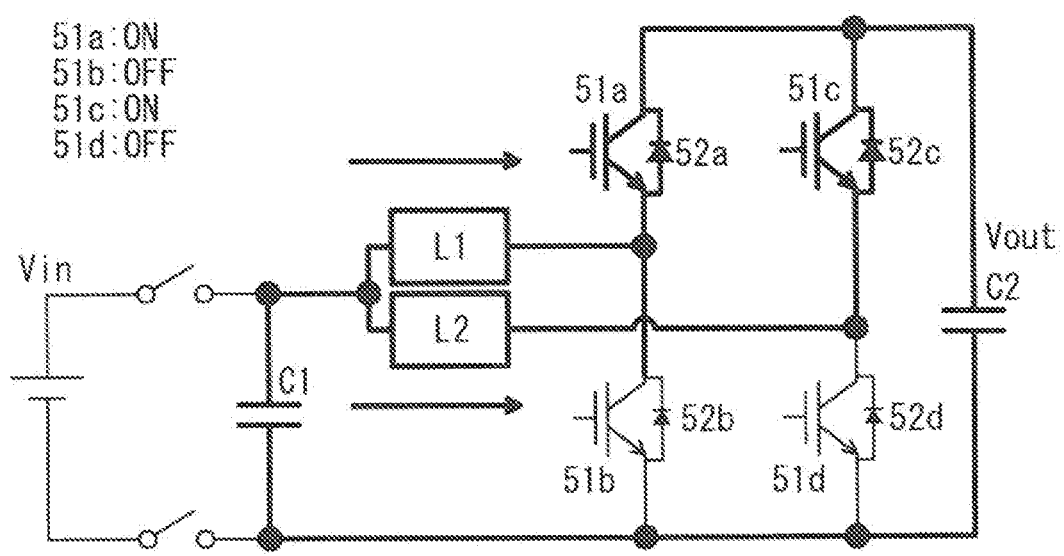
FIG. 17 illustrates an operation pattern of the DC/DC converter according to embodiment 1 of the present disclosure.
Figure 18:
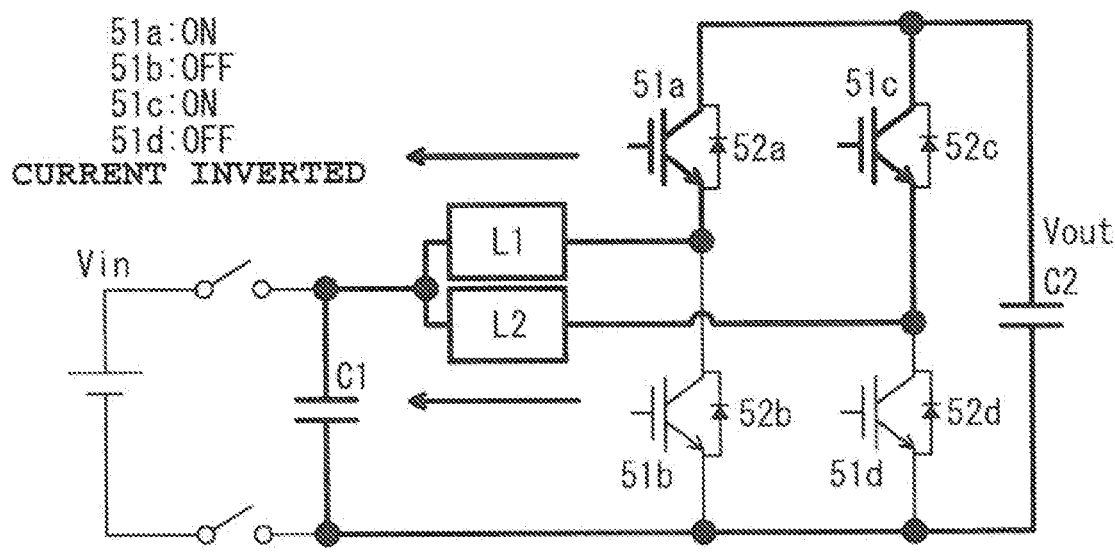
FIG. 18 illustrates an operation pattern of the DC/DC converter according to embodiment 1 of the present disclosure.
Figure 19:
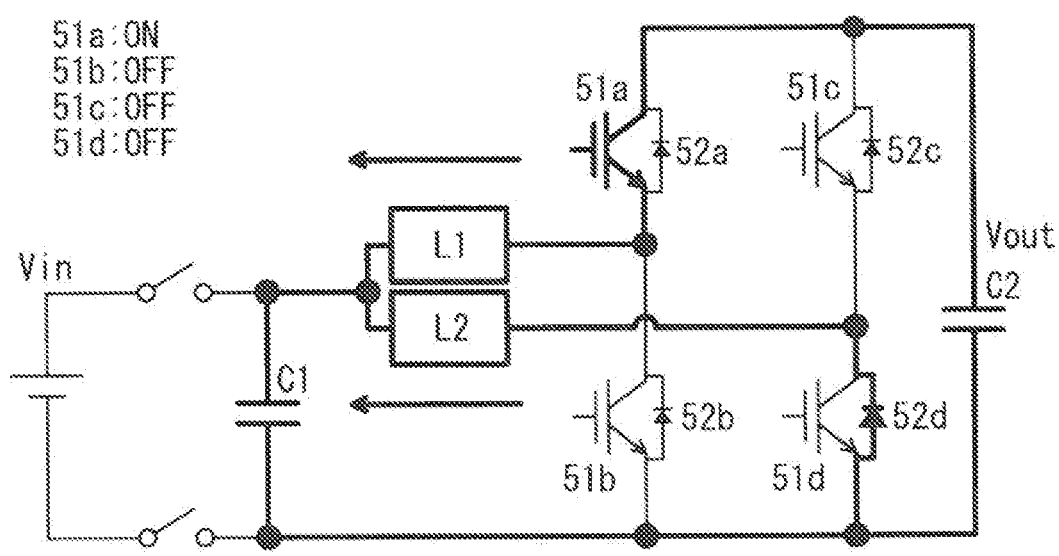
FIG. 19 illustrates an operation pattern of the DC/DC converter according to embodiment 1 of the present disclosure.

Under the condition in which the above relational expressions are satisfied, When the lower arm is operated with the condition of D>0.5 using the DC/DC converter 5 so as to discharge the first smoothing capacitor 3 and the second smoothing capacitor 6, FIG. 7 shows the waveforms of currents flowing through the windings of the differential-type coupled reactor 4, the operation timings of the DC/DC converter 5, and the waveforms of currents flowing through the semiconductor switching elements 51*a* to 51*d* composing the DC/DC converter 5. In addition, FIG. 8 to FIG. 19 show current conduction parts of the DC/DC converter 5 and operation patterns at this time. In FIG. 8 to FIG. 19, the current conduction parts are indicated by thick lines. The current conduction parts and the operation pattern of the DC/DC converter 5 sequentially shift through the states shown in FIG. 8 to FIG. 19 with elapse of time, and after finish of the state shown in FIG. 19, return to the state shown in FIG. 8.

As described above, it is found that currents i1, i2 containing frequency components that are a multiple of the switching frequency of switching of the semiconductor switching elements in the DC/DC converter 5 flow through the first winding 4*e* and the second winding 4*f*.

Next, when collision of the vehicle is detected or when usage of the vehicle is finished and stoppage of power is detected, a discharge operation in which the semiconductor switching elements 51*a* to 51*d* composing the power semiconductor elements included in the DC/DC converter 5 are urged to perform switching operation by the DC/DC converter control unit 9a, so as to discharge electric charges of the first smoothing capacitor 3 and the second smoothing capacitor 6, will be described.

When collision of the vehicle is detected or when usage of the vehicle is finished and stoppage of power is detected, the switch 2 is turned off, the inverter 7 is stopped by the inverter control unit 9b of the controller 9, and in accordance with a command from the discharge determination command unit 9c, the DC/DC converter control unit 9a performs a discharge operation of the DC/DC converter 5.

In this case, the control operation of the DC/DC converter control unit 9a for the DC/DC converter 5 is basically the same as in the control operation of the above-described normal driving case in which the switch 2 is ON. That is, energy stored in the first smoothing capacitor 3 and the second smoothing capacitor 6 is consumed by copper loss and iron loss caused by current flowing through the DC/DC converter 5 and the differential-type coupled reactor 4 which are present between the first smoothing capacitor 3 and the second smoothing capacitor 6, whereby discharging is performed.

However, in the discharge operation in this case, the switching frequency of the DC/DC converter 5 is lowered in comparison with the case of normal power conversion operation, so that current ripple increases within an allowable current range in the DC/DC converter 5. Thus, loss increases, whereby the discharge period in the case where the switch 2 is turned off can be shortened.

When such a discharge operation is performed, LC resonance occurs in the first smoothing capacitor 3, the second smoothing capacitor 6, and the differential-type coupled reactor 4. Therefore, if the switching frequency of the DC/DC converter 5 is excessively lowered, there is a possibility that resonance voltage and resonance current that exceed the allowable values of the DC/DC converter 5, the first smoothing capacitor 3, and the second smoothing capacitor 6, occur.

Figure 20:
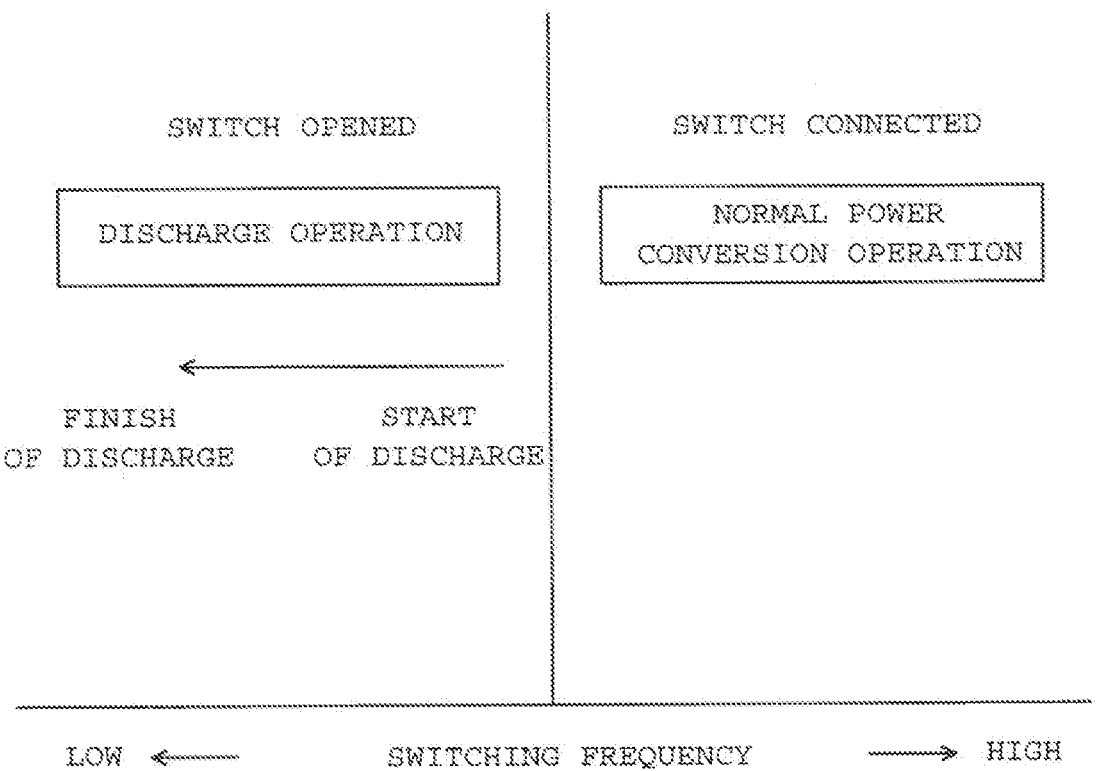
FIG. 20 illustrates a switching frequency when switching operation of the DC/DC converter is performed in embodiment 1 of the present disclosure.

Accordingly, as shown in FIG. 20, control is performed so that the switching frequency of the DC/DC converter 5 is gradually lowered from the frequency in the normal power conversion operation as discharge progresses from the start of discharge of the first smoothing capacitor 3 and the second smoothing capacitor 6, whereby protection of components and shortening of the discharge period can be both achieved. FIG. 20 illustrates the switching frequency when switching operation of the DC/DC converter 5 is performed.

If the discharge period of the first smoothing capacitor 3 and the second smoothing capacitor 6 is shortened as described above, the power supply capacity of the auxiliary power supply 10 for supplying power to the controller 9 which performs drive control of the DC/DC converter 5 for performing discharge operation can be reduced, whereby the entire power conversion device can be downsized.

Embodiment 2

A power conversion device according to embodiment 2 of the present disclosure is characterized in that the coupling configuration of the coupled reactor 4 used in embodiment 1 is changed to a cumulative type. The other configurations are the same as the configurations in embodiment 1, and therefore the detailed description thereof is omitted.

Figure 21:
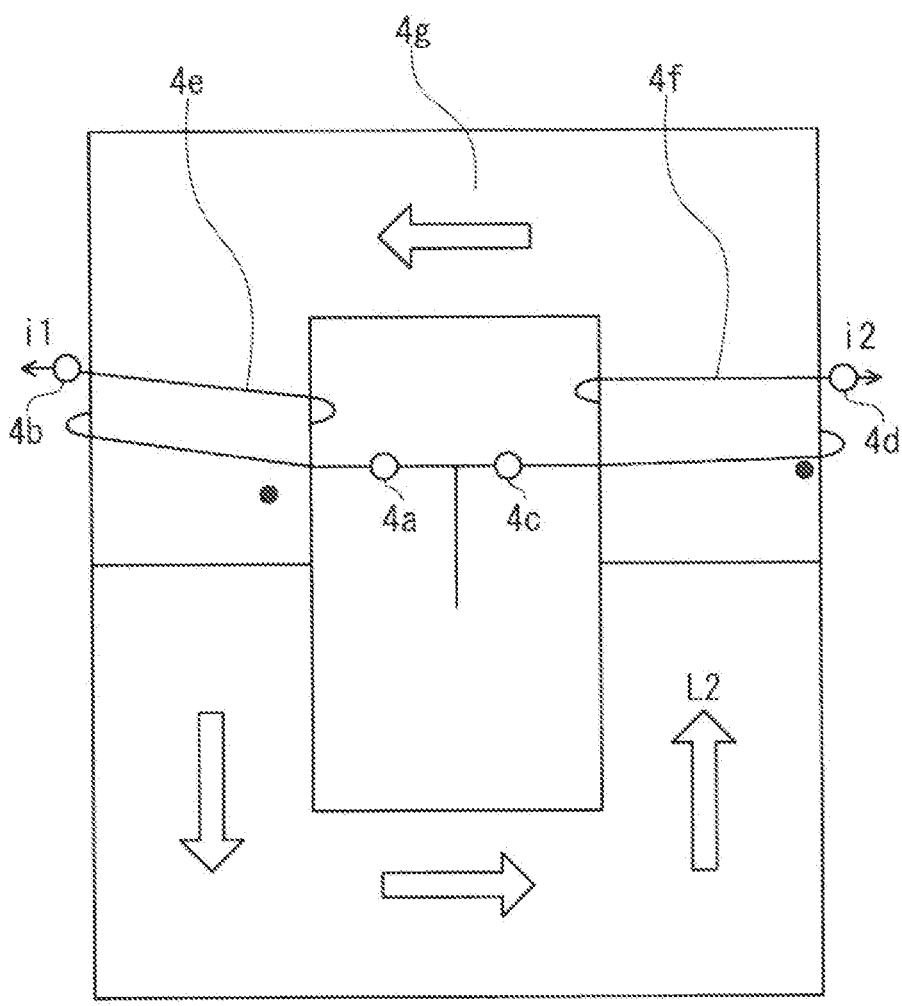
FIG. 21 illustrates the magnetic flux generating state of a cumulative-type coupled reactor in embodiment 2 of the present disclosure.
Figure 22:
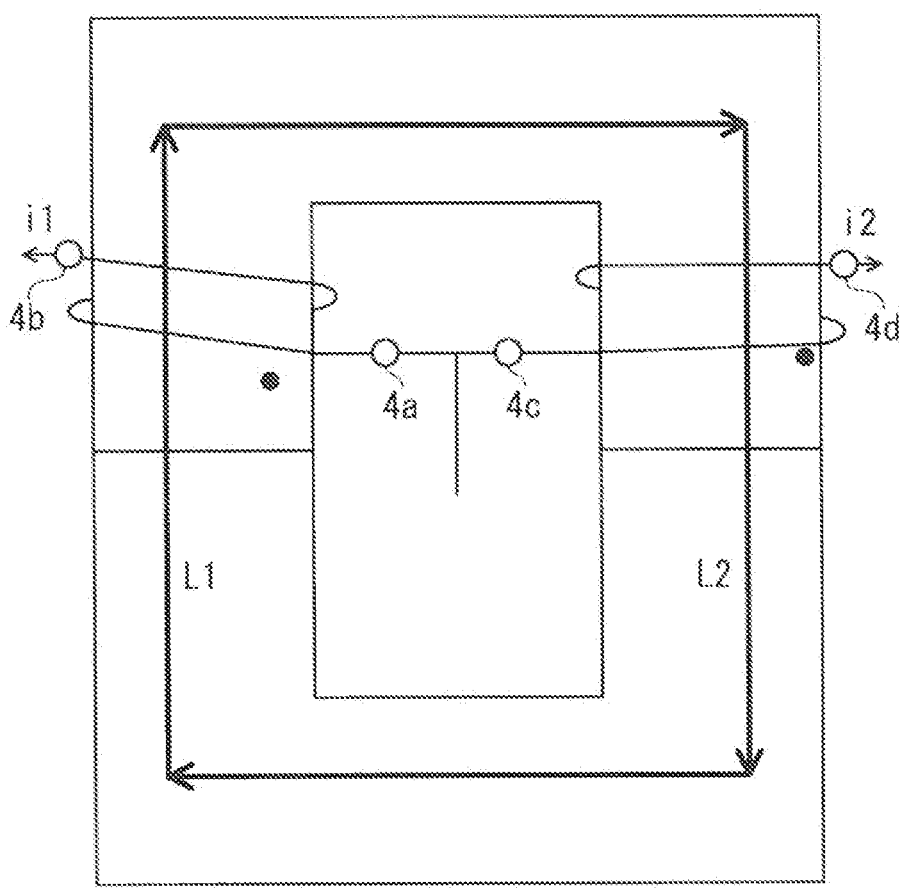
FIG. 22 illustrates the magnetic flux generating state of the cumulative-type coupled reactor in embodiment 2 of the present disclosure.
Figure 23:
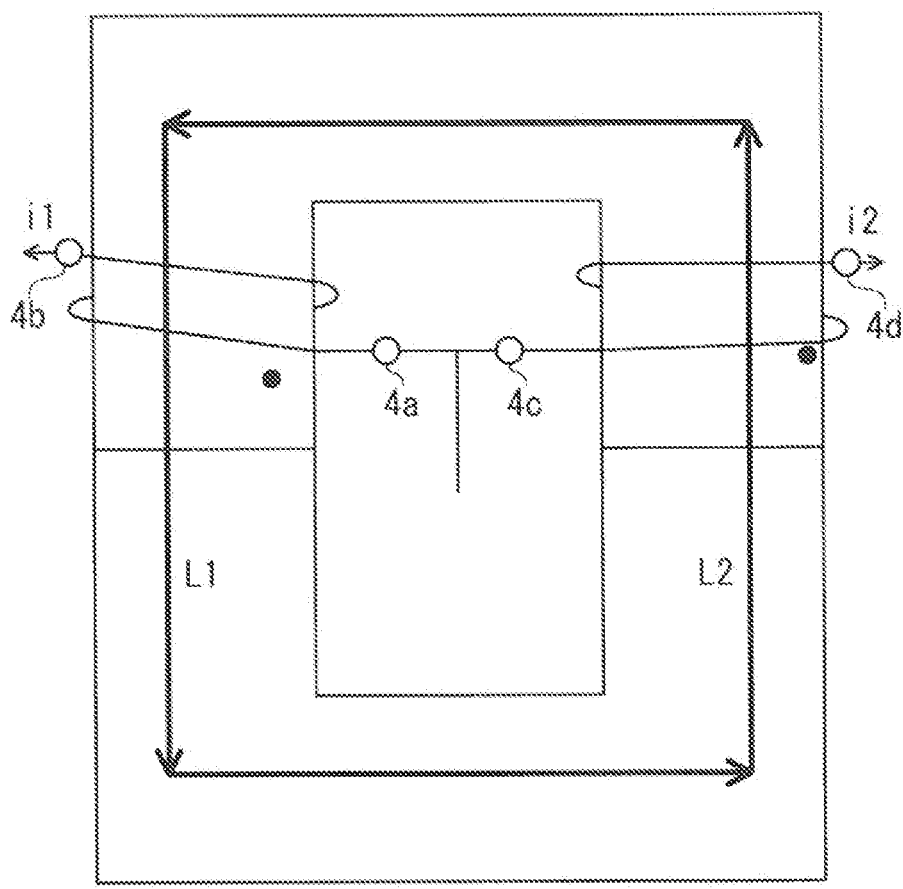
FIG. 23 illustrates the magnetic flux generating state of the cumulative-type coupled reactor in embodiment 2 of the present disclosure.

Here, the cumulative-type coupled reactor 4 refers to a coupled reactor in which the first winding 4e and the second winding 4f are wound so that DC magnetic fluxes generated in the core 4g by the first winding 4e and the second winding 4f are generated in such directions as to strengthen each other when DC current flows through the first winding 4e and the second winding 4f, as shown in FIG. 21.

Figure 24:
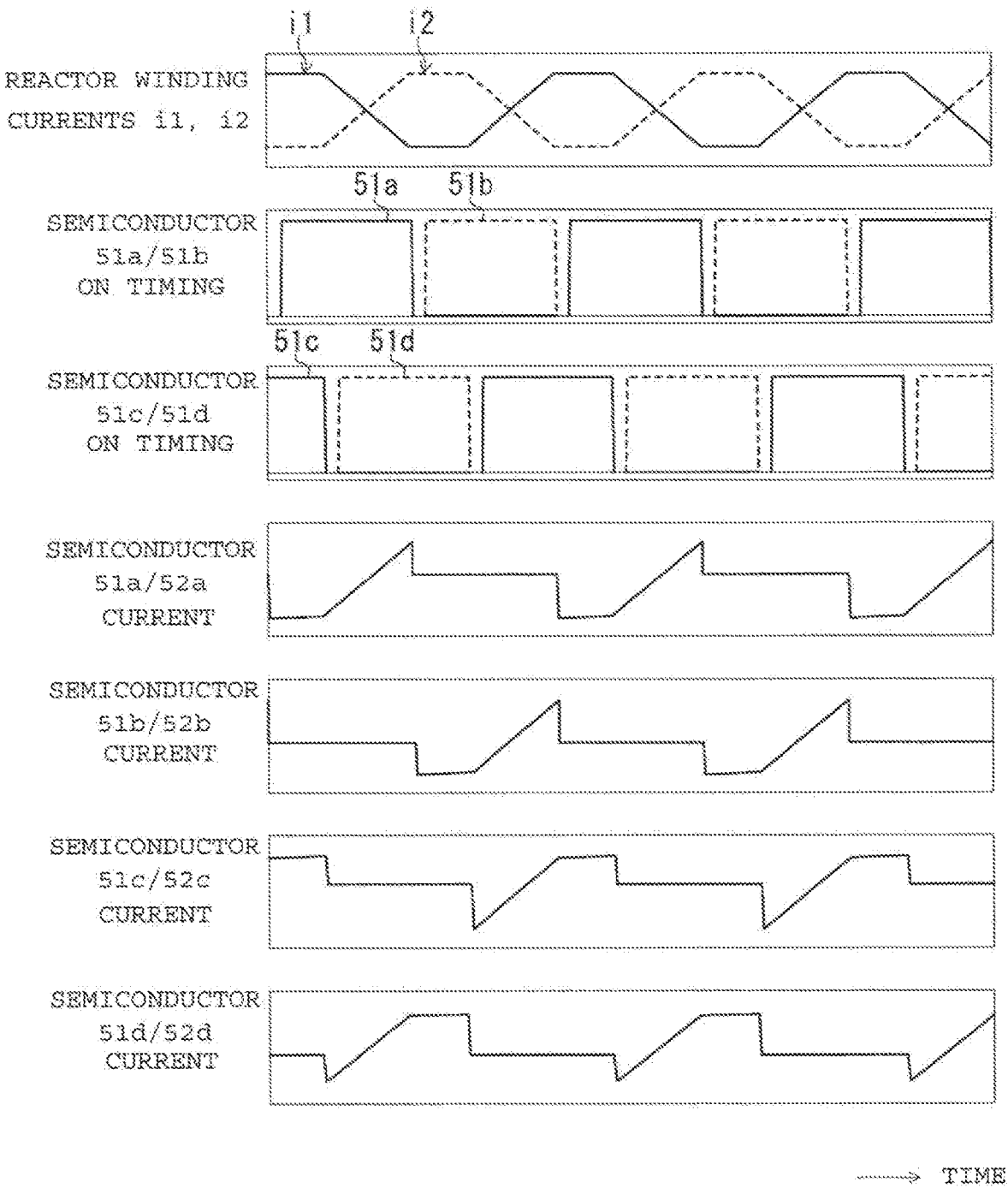
FIG. 24 illustrates the operation timings of the DC/DC converter and changes over time in currents flowing through windings of the coupled reactor and each part of the DC/DC converter, in embodiment 2 of the present disclosure.
Figure 25:
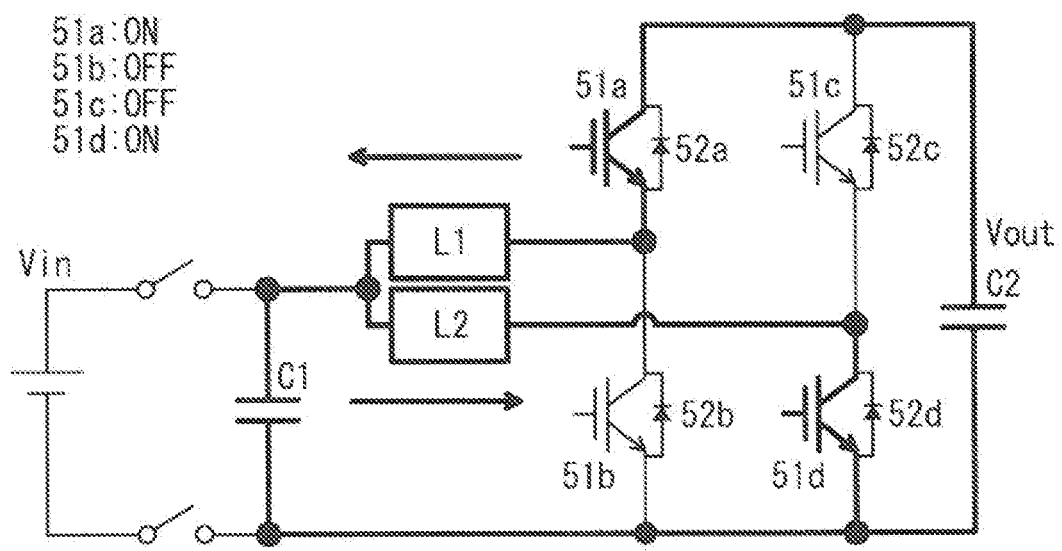
FIG. 25 illustrates an operation pattern of the DC/DC converter according to embodiment 2 of the present disclosure.
Figure 26:
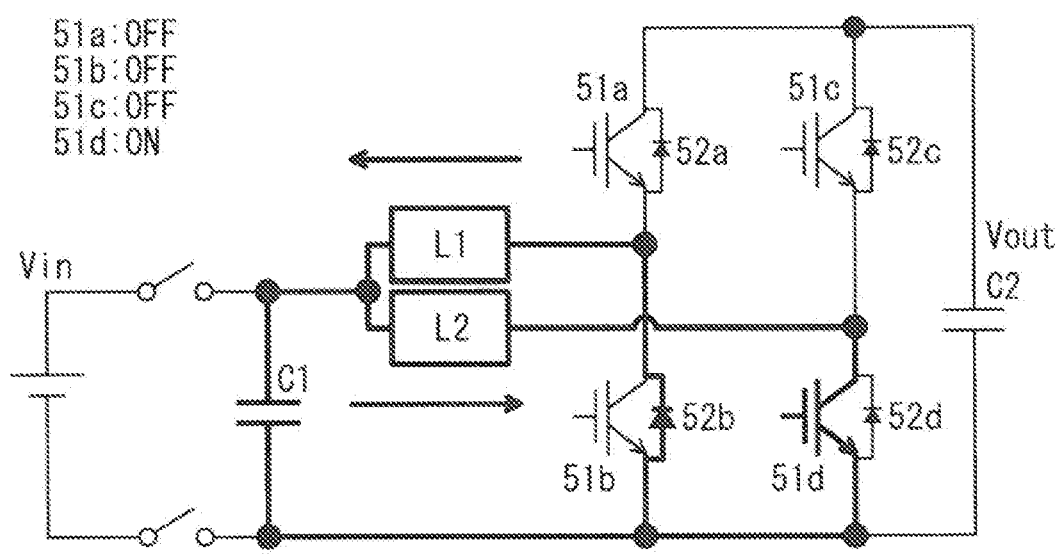
FIG. 26 illustrates an operation pattern of the DC/DC converter according to embodiment 2 of the present disclosure.
Figure 27:
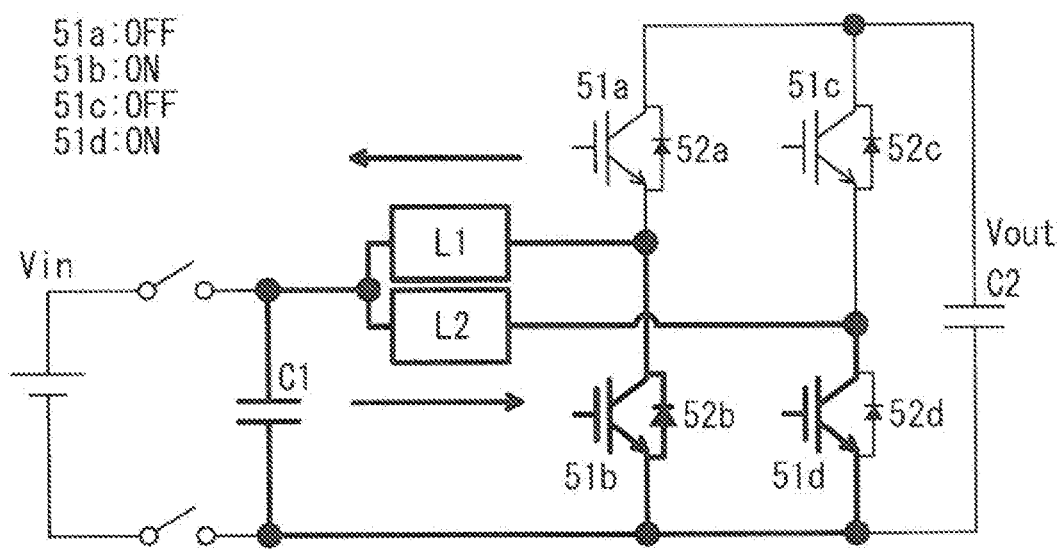
FIG. 27 illustrates an operation pattern of the DC/DC converter according to embodiment 2 of the present disclosure.
Figure 28:
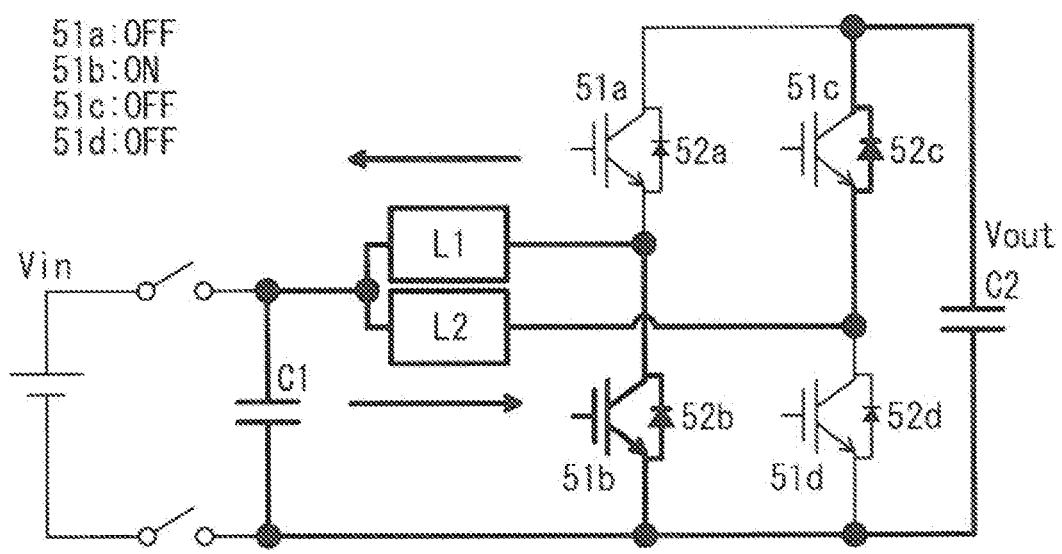
FIG. 28 illustrates an operation pattern of the DC/DC converter according to embodiment 2 of the present disclosure.
Figure 29:
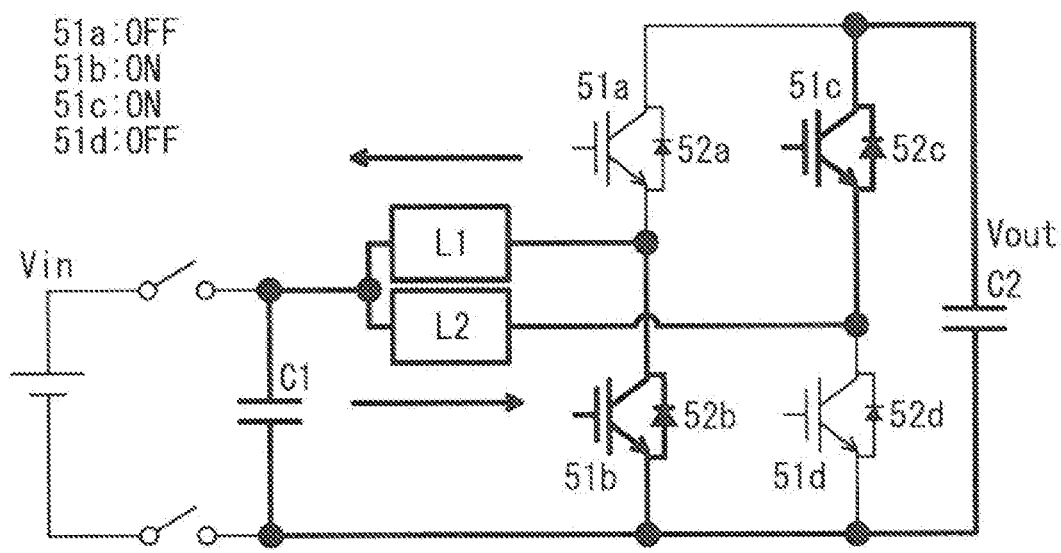
FIG. 29 illustrates an operation pattern of the DC/DC converter according to embodiment 2 of the present disclosure.
Figure 30:
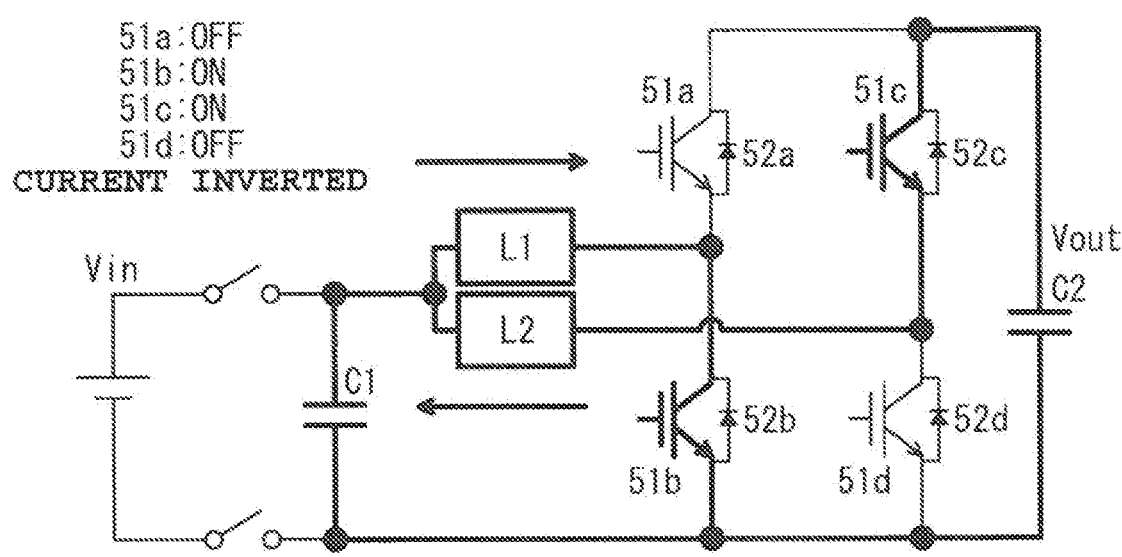
FIG. 30 illustrates an operation pattern of the DC/DC converter according to embodiment 2 of the present disclosure.
Figure 31:
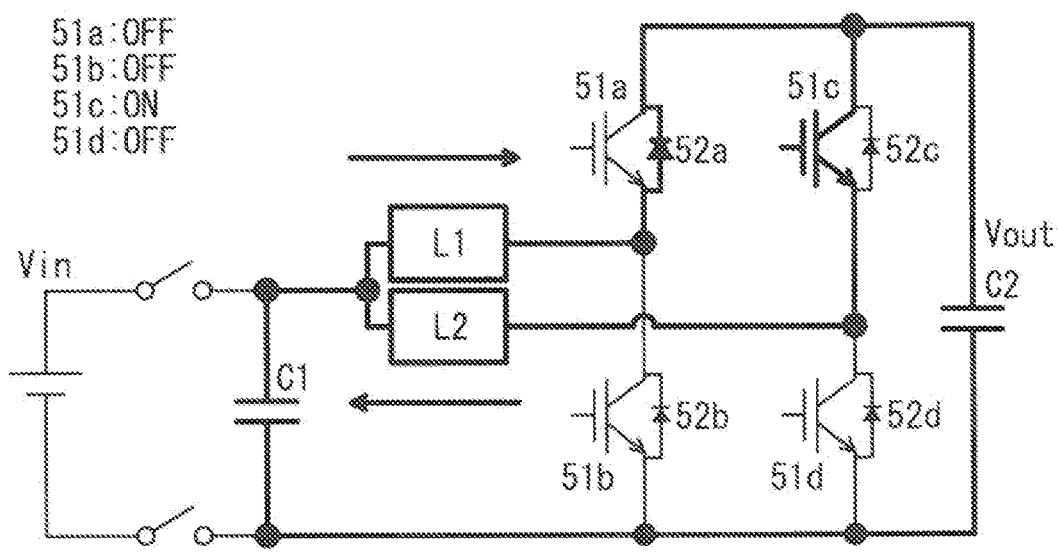
FIG. 31 illustrates an operation pattern of the DC/DC converter according to embodiment 2 of the present disclosure.
Figure 32:
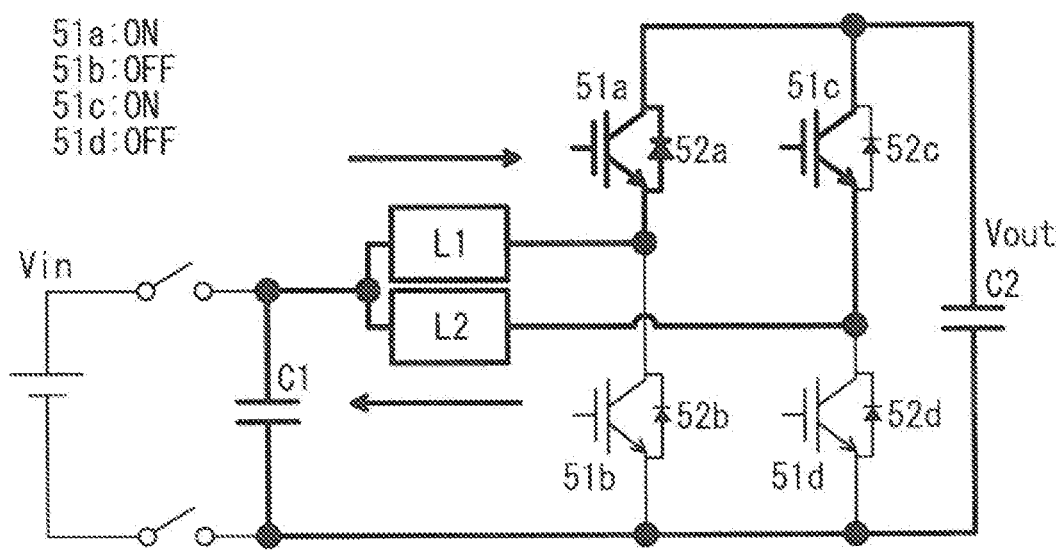
FIG. 32 illustrates an operation pattern of the DC/DC converter according to embodiment 2 of the present disclosure.
Figure 33:
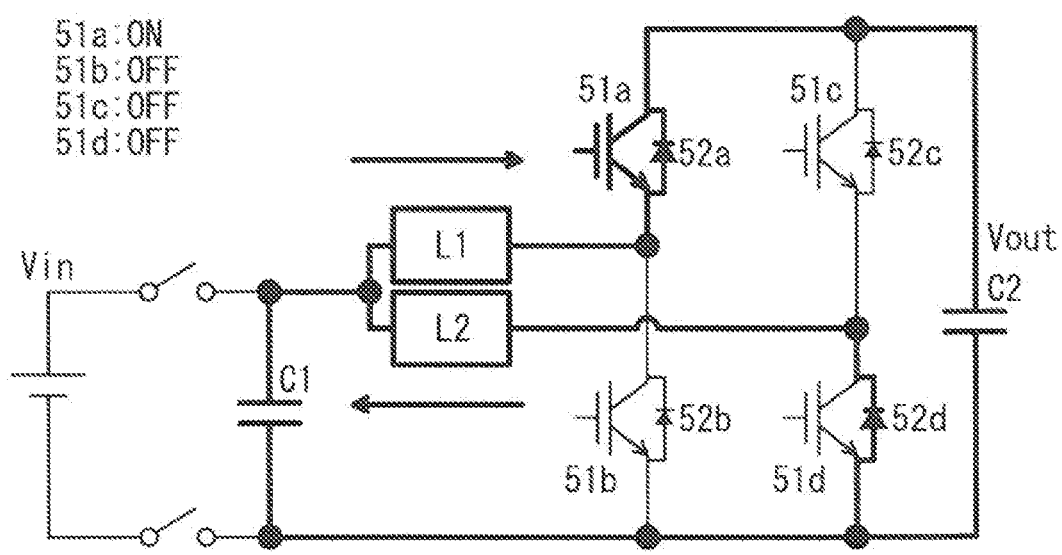
FIG. 33 illustrates an operation pattern of the DC/DC converter according to embodiment 2 of the present disclosure.
Figure 34:
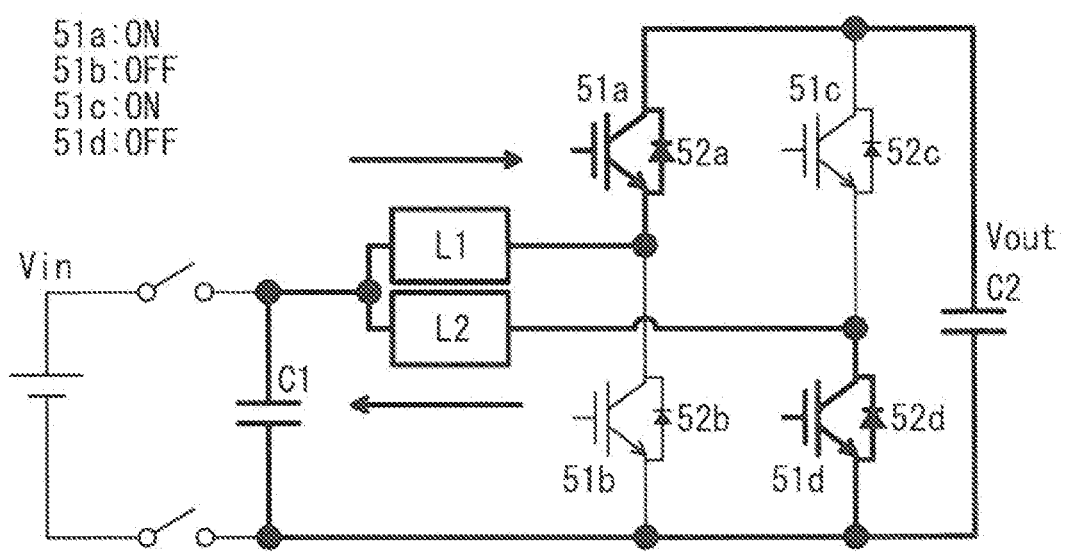
FIG. 34 illustrates an operation pattern of the DC/DC converter according to embodiment 2 of the present disclosure.

FIG. 24 shows the switching timings of the DC/DC converter 5, and changes over time in current at each part and winding currents of the coupled reactor 4, when phase shift operation of the DC/DC converter 5 is performed, using the cumulative-type coupled reactor 4. FIG. 25 to FIG. 34 show current routes and operation patterns of the DC/DC converter 5. It is noted that the current conduction parts and the operation pattern of the DC/DC converter 5 sequentially shift through the states shown in FIG. 25 to FIG. 34 with elapse of time, and after finish of the state shown in FIG. 34, return to the state shown in FIG. 25.

When the DC/DC converter 5 is driven by phase shift operation using the cumulative-type coupled reactor 4, the DC/DC converter 5 performs reflux operation, as shown in FIG. 24 and FIG. 25 to FIG. 34. Thus, square-wave-shaped currents having high effective values flow through the first winding 4e and the second winding 4f of the cumulative-type coupled reactor 4, so that copper loss increases, whereby the discharge period in the case where the switch 2 is turned off can be shortened as well as the case in embodiment 1.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 DC power supply
2 switch
3 first smoothing capacitor
4 coupled reactor
4e first winding
4f second winding
4g core
40a, 40b, 40c current sensor
5 DC/DC converter
51a to 51d semiconductor switching element
6 second smoothing capacitor
7 inverter
71a to 71f semiconductor switching element
8 electric motor
9 controller
9a DC/DC converter control unit
9b inverter control unit
9c discharge determination command unit
10 auxiliary power supply
20 first voltage sensor
30 second voltage sensor

The invention claimed is:

1. A power conversion device comprising:
a coupled reactor magnetically coupled and a DC/DC converter for voltage conversion, which are provided between a DC power supply and an inverter for driving an electric motor;
a first smoothing capacitor connected between the DC power supply and the coupled reactor;
a second smoothing capacitor connected between the DC/DC converter and the inverter;
a switch for turning on/off the DC power supply, the switch being interposed between the first smoothing capacitor and the DC power supply; and
a controller configured to control switching operations of semiconductor switching elements included in the inverter and the DC/DC converter, wherein
the DC/DC converter has a full-bridge configuration in which two legs are connected in parallel, each leg being formed by connecting, in series, a pair of upper and lower arms having the semiconductor switching elements,
the coupled reactor includes a first winding and a second winding each having one end side connected to a positive side of the DC power supply,
the first winding has another end side connected to a connection point between the upper and lower arms composing a first leg of the legs,
the second winding has another end side connected to a connection point between the upper and lower arms composing a second leg of the legs, and
the controller, in accordance with a discharge command, opens the switch, causes the semiconductor switching elements composing the upper and lower arms of the DC/DC converter to perform complementary operations so as to be alternately turned on/off, and causes the pair of legs to operate with their switching phases shifted from each other,
whereby the first smoothing capacitor and the second smoothing capacitor are discharged.

2. The power conversion device according to claim 1, wherein
the controller controls the DC/DC converter so that AC current circulates through the coupled reactor and the DC/DC converter between the first smoothing capacitor and the second smoothing capacitor and electric charges stored in the first smoothing capacitor and the second smoothing capacitor are discharged by energy loss due to the coupled reactor and the DC/DC converter.

3. The power conversion device according to claim 1, wherein
the coupled reactor is a differential type in which DC magnetic fluxes generated by the first winding and the second winding are formed in such directions as to cancel out each other when DC current flows through the first winding and the second winding.

4. The power conversion device according to claim 3, wherein
AC current containing a component that is a multiple of a switching frequency of the DC/DC converter flows through the coupled reactor by setting so as to satisfy the following relationships:

in a case of $D<0.5, M/L>D/(1-D)$ in a case of $D>0.5, M/L>(1-D)/D$ where D is a duty ratio with which the semiconductor switching elements of the DC/DC converter are turned on/off, L is a self-inductance of the coupled reactor, and M is a mutual inductance of the coupled reactor.

5. The power conversion device according to claim 4, wherein
when the switch is turned off, the controller changes the duty ratio with which the semiconductor switching elements of the DC/DC converter are turned on/off, in accordance with voltages of the first smoothing capacitor and the second smoothing capacitor or a voltage difference therebetween, so as to maximize ripple current flowing through the coupled reactor within such a range as not to exceed a certain allowable value set in advance.

6. The power conversion device according to claim 1, wherein
the coupled reactor is a cumulative-type in which DC magnetic fluxes generated by the first winding and the second winding are generated in such directions as to strengthen each other when DC current flows through the first winding and the second winding.

7. The power conversion device according to claim 6, wherein
when the switch is turned off, the controller shifts a phase of the DC/DC converter in accordance with voltages of the first smoothing capacitor and the second smoothing capacitor or a voltage difference therebetween, so as to maximize ripple current flowing through the coupled reactor within such a range as not to exceed a certain allowable value set in advance.

8. The power conversion device according to claim 1, wherein
when the switch is turned off, the controller causes the semiconductor switching elements of the DC/DC converter to operate at a switching frequency lower than that in a case where the switch is turned on, so that the first smoothing capacitor and the second smoothing capacitor are discharged by energy loss due to the coupled reactor and the DC/DC converter.

9. The power conversion device according to claim 8, wherein
the controller performs control so that the switching frequency for the semiconductor switching elements in the case where the switch is turned off is gradually lowered with elapse of time.

10. The power conversion device according to claim 1, further comprising the inverter for converting DC voltage outputted from the DC/DC converter, to AC voltage.

11. The power conversion device according to claim 2, wherein
the coupled reactor is a differential type in which DC magnetic fluxes generated by the first winding and the second winding are formed in such directions as to cancel out each other when DC current flows through the first winding and the second winding.

12. The power conversion device according to claim 11, wherein
AC current containing a component that is a multiple of a switching frequency of the DC/DC converter flows through the coupled reactor by setting so as to satisfy the following relationships:

in a case of $D<0.5, M/L>D/(1-D)$ in a case of $D>0.5, M/L>(1-D)/D$ where D is a duty ratio with which the semiconductor switching elements of the DC/DC converter are turned on/off, L is a self-inductance of the coupled reactor, and M is a mutual inductance of the coupled reactor.

13. The power conversion device according to claim 12, wherein when the switch is turned off, the controller changes the duty ratio with which the semiconductor switching elements of the DC/DC converter are turned on/off, in accordance with voltages of the first smoothing capacitor and the second smoothing capacitor or a voltage difference therebetween, so as to maximize ripple current flowing through the coupled reactor within such a range as not to exceed a certain allowable value set in advance.

14. The power conversion device according to claim 2, wherein the coupled reactor is a cumulative-type in which DC magnetic fluxes generated by the first winding and the second winding are generated in such directions as to strengthen each other when DC current flows through the first winding and the second winding.

15. The power conversion device according to claim 14, wherein when the switch is turned off, the controller shifts a phase of the DC/DC converter in accordance with voltages of the first smoothing capacitor and the second smoothing capacitor or a voltage difference therebetween, so as to maximize ripple current flowing through the coupled reactor within such a range as not to exceed a certain allowable value set in advance.

* * * * *